(12) United States Patent
Glass et al.

(10) Patent No.: US 11,574,276 B2
(45) Date of Patent: Feb. 7, 2023

(54) WAREHOUSE MANAGEMENT, A ROBOT AND AN ADAPTOR

(71) Applicant: CAJA ELASTIC DYNAMIC SOLUTIONS LTD, Binyamina (IL)

(72) Inventors: Guy Glass, Binyamina (IL); Reuven Della Torre, Ramat-Gan (IL); Avi Lifshitz, Binyamina (IL)

(73) Assignee: CAJA ELASTIC DYNAMIC SOLUTIONS LTD., Binyamina (IL)

( * ) Notice: Subject to any disclaimer, the term of this patent is extended or adjusted under 35 U.S.C. 154(b) by 74 days.

(21) Appl. No.: 16/954,496

(22) PCT Filed: Dec. 18, 2018

(86) PCT No.: PCT/IB2018/060261
§ 371 (c)(1),
(2) Date: Jun. 16, 2020

(87) PCT Pub. No.: WO2019/123254
PCT Pub. Date: Jun. 27, 2019

(65) Prior Publication Data
US 2021/0090001 A1 Mar. 25, 2021

Related U.S. Application Data

(60) Provisional application No. 62/651,280, filed on Apr. 2, 2018, provisional application No. 62/599,952, filed on Dec. 18, 2017.

(51) Int. Cl.
*G06Q 10/08* (2012.01)
*B65G 1/04* (2006.01)
*B65G 1/137* (2006.01)

(52) U.S. Cl.
CPC .......... *G06Q 10/08* (2013.01); *B65G 1/0407* (2013.01); *B65G 1/0492* (2013.01); *B65G 1/1378* (2013.01)

(58) Field of Classification Search
None
See application file for complete search history.

(56) References Cited

U.S. PATENT DOCUMENTS

| 9,120,622 B1 | 9/2015 | Elazary et al. |
| 2013/0073076 A1* | 3/2013 | Mathi ................. B65G 1/1376 700/216 |

(Continued)

FOREIGN PATENT DOCUMENTS

| DE | 102014111385 A1 | 2/2016 |
| EP | 2102080 B1 | 1/2012 |

(Continued)

OTHER PUBLICATIONS

Supplementary European Search Report for PCT Patent Application No. PCT/IB2018/060261 (dated Dec. 21, 2021).

*Primary Examiner* — Kristy A Haupt
(74) *Attorney, Agent, or Firm* — Kenealy Vaidya LLP

(57) ABSTRACT

A method for retrieving content stored in a warehouse, the method may include: maintaining first content in boxes of a lowest shelf of a storage unit of the warehouse, while maintaining in boxes of higher shelves of the storage unit second content that is of less interest than the first content; accessing the boxes of the lowest shelf and providing the boxes to interfacing units, by a first robot; accessing the boxes of the higher shelves and providing the boxes to the interfacing units, by a second robot; wherein the first robot, when positioned at a lower position, is lower than a height of the lowest shelf; and wherein the second robot is higher than the height of the lowest shelf.

14 Claims, 35 Drawing Sheets

(56) References Cited

U.S. PATENT DOCUMENTS

| | | | |
|---|---|---|---|
| 2015/0068997 A1* | 3/2015 | Nomura | A47B 57/40 |
| | | | 211/134 |
| 2016/0016733 A1 | 1/2016 | Lert | |
| 2016/0060037 A1 | 3/2016 | Razumov | |
| 2016/0207709 A1 | 7/2016 | Pankratov et al. | |
| 2016/0304280 A1 | 10/2016 | Elazary et al. | |
| 2016/0355337 A1 | 12/2016 | Lert et al. | |
| 2017/0121114 A1 | 5/2017 | Einav et al. | |
| 2017/0152106 A1 | 6/2017 | Hofmann | |
| 2017/0174431 A1 | 6/2017 | Borders et al. | |
| 2017/0267452 A1* | 9/2017 | Goren | B65G 1/137 |

FOREIGN PATENT DOCUMENTS

| | | |
|---|---|---|
| EP | 3192616 A1 | 7/2017 |
| KR | 1020170106410 A | 9/2017 |
| WO | 2008068262 A1 | 6/2008 |
| WO | 2017/121747 A1 | 7/2017 |

\* cited by examiner

| Maintaining first content in boxes of a lowest shelf of a storage unit of the warehouse, while maintaining in boxes of higher shelves of the storage unit second content that is of less interest than the first content. 910 | Accessing one or more boxes of one or more lowest shelves of one or more storage units of the warehouse and providing the one or more boxes to one or more interfacing units of the warehouse, by one or more first robots. 920 | Accessing one or more boxes of higher shelves of the one or more storage units and providing the one or more boxes to the interfacing units, by one or more second robot. In each storage unit the higher shelves are higher than the lowest shelf. 930 |

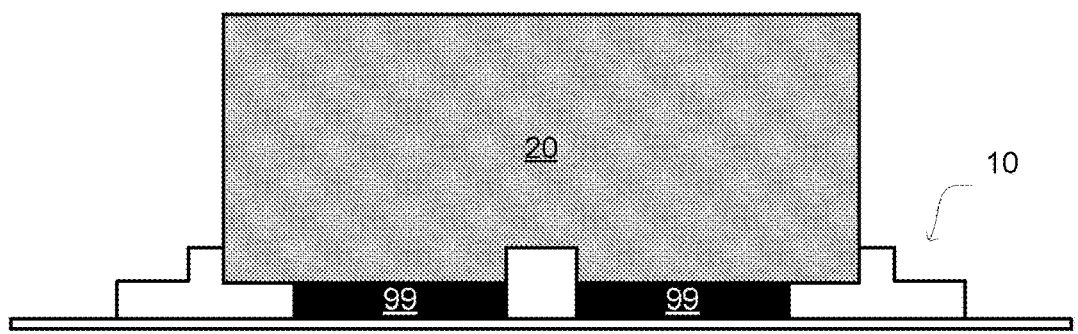
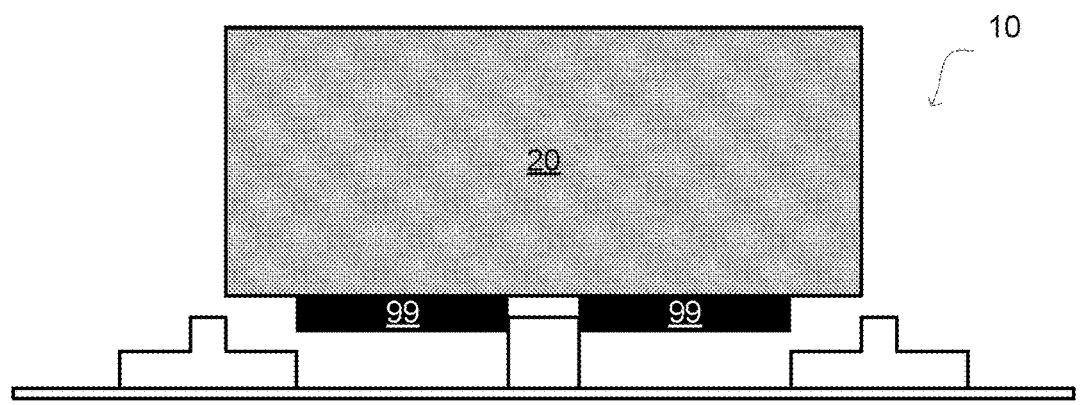
FIG. 9

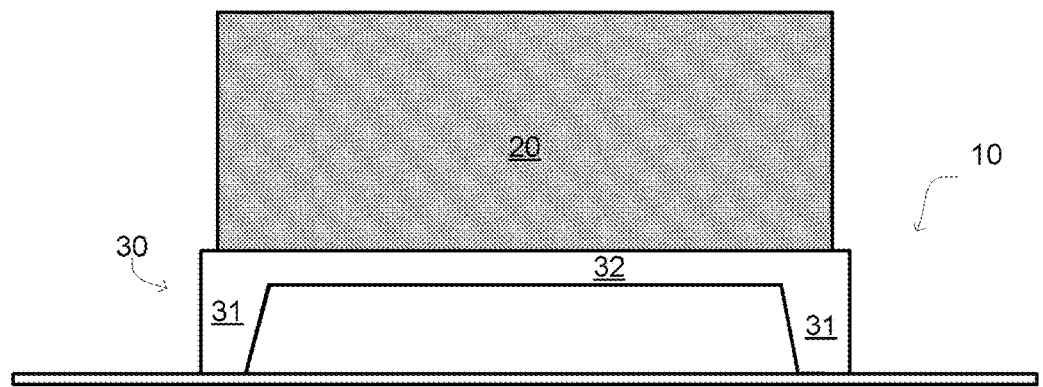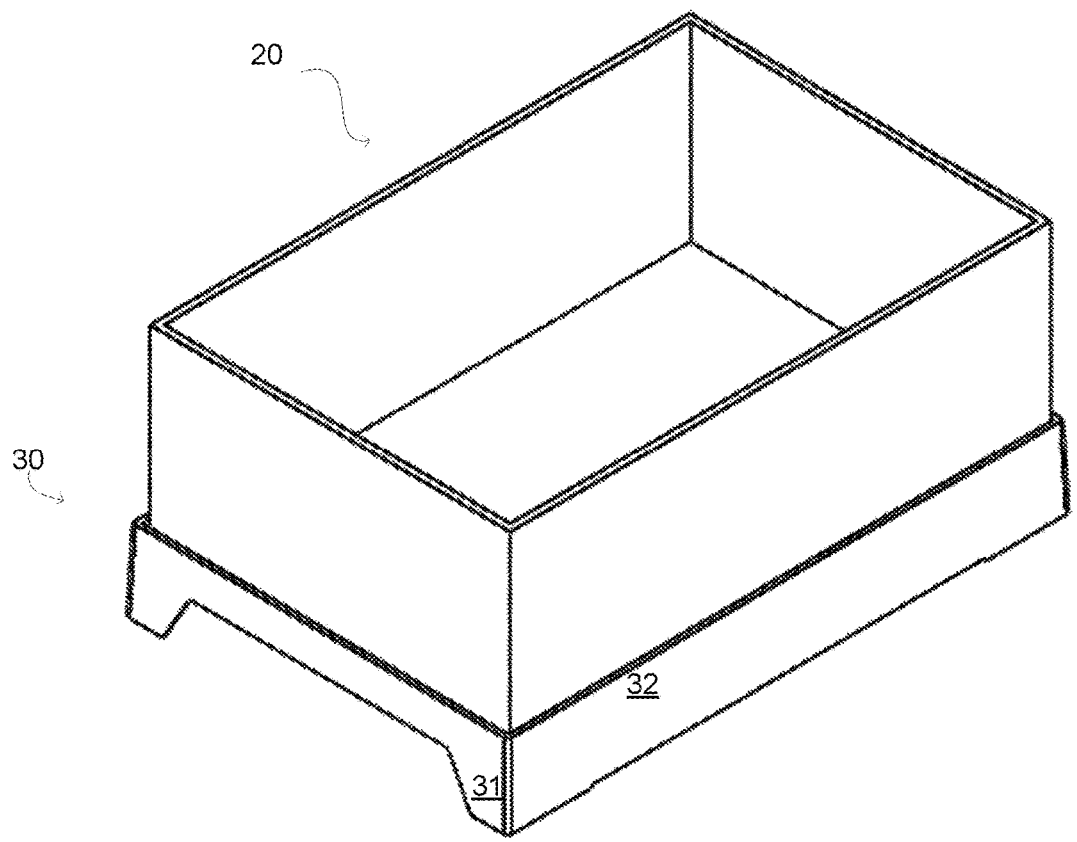
FIG. 14

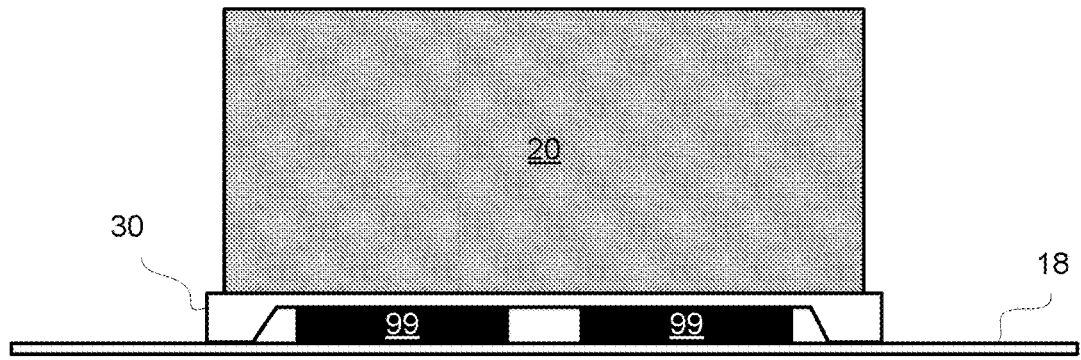
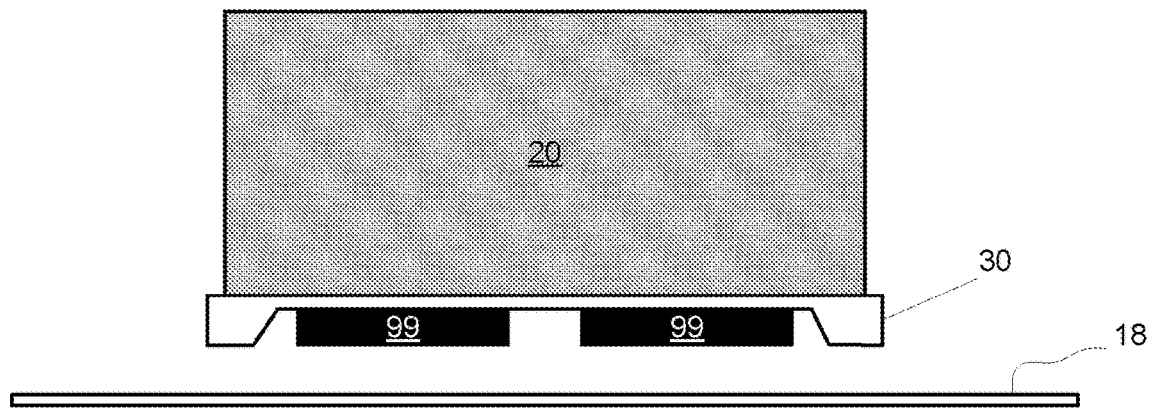
FIG. 15

WAREHOUSE MANAGEMENT, A ROBOT AND AN ADAPTOR

CROSS REFERENCE

This application claims priority from U.S. provisional patent Ser. No. 62/599,952 filing date 18 Dec. 2017 and U.S. provisional patent Ser. No. 62/651,280 filing date 2 Apr. 2018 both of which are incorporated herein in their entirety.

BACKGROUND

Now days, every manual warehouse includes flat shelves for storing inventory. Every flat shelf may support different boxes of different sizes.

Manual management of these boxes is time consuming and inefficient.

There is a growing need to provide a warehouse that can be managed automatically using robots to load and unload inventory.

SUMMARY

There may be provided a method for retrieving content stored in a warehouse, the method may include (a) maintaining first content in boxes of one or more lower shelves of a storage unit of the warehouse, while maintaining in boxes of one more more lower shelves of the storage second content that is of less interest than the first content, wherein each shelf of the one or more lower shelves is higher than each shelf of the one or more higher shelves; (b) accessing the boxes of one or more lower shelves and providing the boxes to interfacing units, by a first robot; and (c) accessing the boxes of the higher shelves and providing the boxes to the interfacing units, by a second robot that differs from the first robot. The second robot may differ from the first robot by size, complexity, cost, height, span of movement, and the like.

The one or more lower shelves consist of a lowest shelf of the storage unit.

The first robot, when positioned at a lower position, may or may not be lower than a height of the lowest shelf.

The second robot may or may not be higher than the height of the lowest shelf.

Alternatively—the one or more lower shelves may include more than the lowest shelf. There may be provided a method for retrieving content stored in a warehouse, the method may include maintaining first content in boxes of a lowest shelf of a storage unit of the warehouse, while maintaining in boxes of higher shelves of the storage unit second content that may be of less interest than the first content; accessing the boxes of the lowest shelf and providing the boxes to interfacing units, by a first robot; accessing the boxes of the higher shelves and providing the boxes to the interfacing units, by a second robot; wherein the first robot, when positioned at a lower position, may be lower than a height of the lowest shelf; and wherein the second robot may be higher than the height of the lowest shelf.

An accessing of a box of the lowest shelf may include reaching the storage unit by moving below the lowest shelf.

The accessing of the box may include following the reaching of the storage unit, lifting robot interfacing element of the first robot, moving the first robot in relation to the box thereby inserting the robot interfacing element in a gap between a surface of the lower shelf and a bottom of the box; lifting the box by the robot interfacing element; and moving the robot with the box away from the lower shelf.

The accessing of the box may include may be executed without rotating the robot interfacing element in relation to a housing of the first robot.

The reaching of the storage unit may be followed by lifting robot interfacing element of the first robot, moving the first robot in relation to the box thereby inserting the robot interfacing element in a gap between a surface of the lower shelf and a bottom of an adaptor that supports the box; lifting the box by the robot interfacing element; and moving the robot with the box away from the lower shelf.

The adaptor may be fixed to the lowest shelf.

The adaptor may include spacers that may be configured to elevate the box above a surface of the lowest shelf while maintaining at least a portion of the surface untouched.

The adaptor may include stoppers for preventing the boxes from slipping backwards.

The adaptor may include an intermediate element that may be configured to split a gap formed between a bottom of a box, surface of the lowest shelf and a pair of spacers.

The adaptor may be detachably positioned on a surface of the lowest shelf.

The adaptor may include legs, a base supported by the legs and sidewalls that extend above the base.

The accessing of the box may include may be executed without rotating the robot interfacing element in relation to a housing of the first robot.

The maintaining of the first content in boxes of the lowest shelf of the storage unit and the maintaining in boxes of higher shelves of the storage unit second content may include replacing, by the first robot, at least one box from the lowest shelf by at least one box from one of the higher shelves.

The warehouse may include multiple storage units, wherein the accessing of a box of the lowest shelf by moving below at least some of the multiple storage units; and wherein the accessing of a box of one of the upper shelves may include reaching the storage unit by moving, by the second robot, at pathways formed between the multiple storage units.

The method may include receiving, by the first robot, boxes that may include the first content from the interfacing unit; accessing the storage unit and unloading the boxes to the lowest shelf; receiving, by the second robot, boxes that may include the second content from the interfacing unit; and accessing the storage unit and unloading the boxes to the upper shelves.

The method may include accessing one or more boxes of one or more lowest shelves of one or more storage units of the warehouse by one or more first robots while accessing one or more boxes of one or more higher shelves of the one or more storage units of the warehouse by one or more second robots.

the height of the lowest shelf may be below a meter.

There may be provided a non-transitory computer readable medium that stores instructions that once executed by a computerized system causes the computerized system to execute a process of retrieving content stored in a warehouse, by maintaining first content in boxes of one or more lower shelves of a storage unit of the warehouse, while maintaining in boxes of one more more lower shelves of the storage second content that may be of less interest than the first content; wherein each shelf of the one or more lower shelves may be higher than each shelf of the one or more higher shelves; accessing the boxes of one or more lower shelves and providing the boxes to interfacing units, by a first robot; accessing the boxes of the higher shelves and providing the boxes to the interfacing units, by a second robot that differs from the first robot.

BRIEF DESCRIPTION OF THE DRAWINGS

In order to understand the invention and to see how it may be carried out in practice, a preferred embodiment will now be described, by way of non-limiting example only, with reference to the accompanying drawings.

FIG. 1 is an example of a method;
FIG. 9 illustrates an example of a static adaptor and a box that is lifted or lowered;
FIG. 14 illustrates an example of a box and a movable adaptor;
FIG. 15 illustrates an example of a box and a movable adaptor that are lifted or lowered.

DETAILED DESCRIPTION OF THE DRAWINGS

Figure 2:
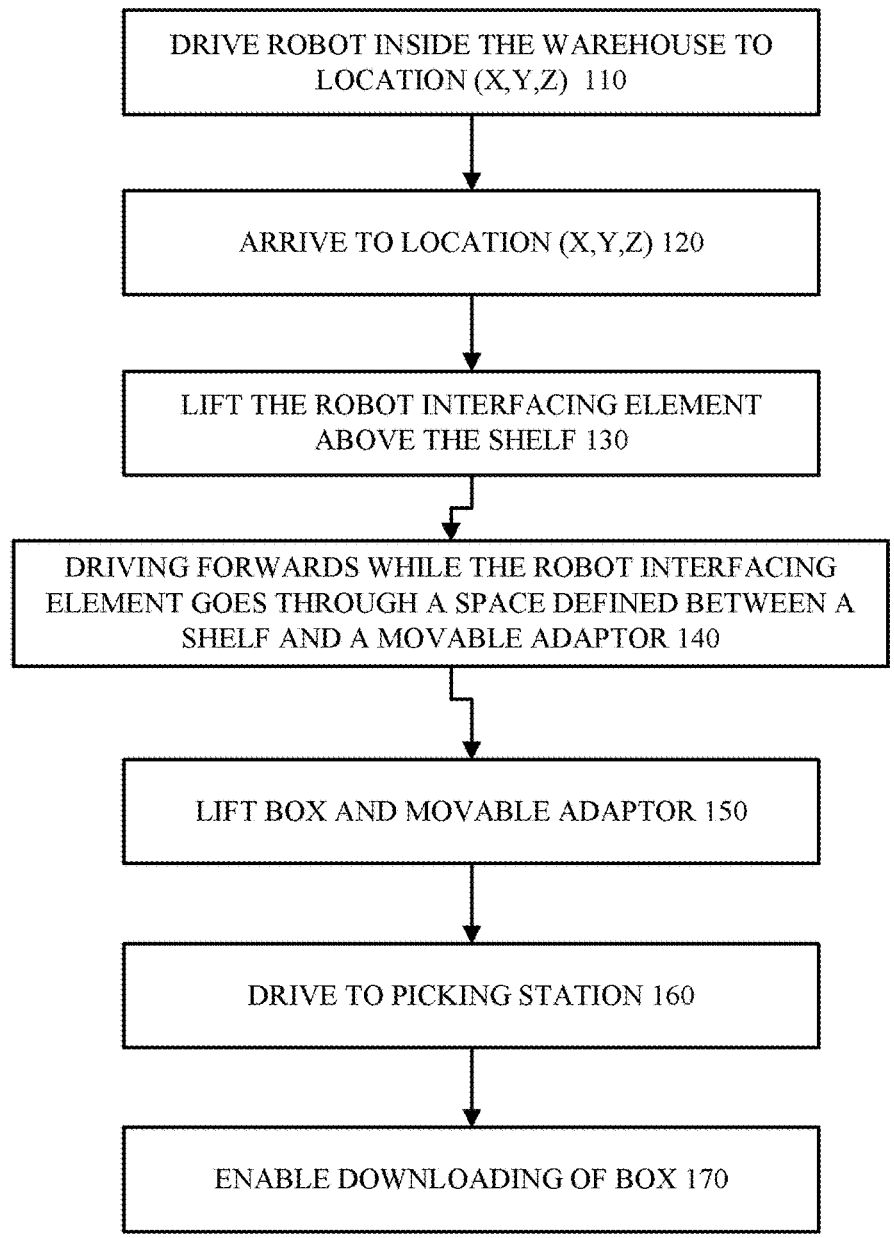
FIG. 2 is an example of a method.

Any reference to a system or robot should be applied, mutatis mutandis to a method that is executed by a system or robot and/or to a non-transitory computer readable medium that stores instructions that once executed by the system or robot will cause the system or robot to execute the method.

Any reference to method should be applied, mutatis mutandis to a system or robot that is configured to execute the method and/or to a non-transitory computer readable medium that stores instructions that once executed by the system or robot will cause the system or robot to execute the method.

Any reference to a non-transitory computer readable medium should be applied, mutatis mutandis to a method that is executed by a system or robot and/or a system or robot that is configured to execute the instructions stored in the non-transitory computer readable medium.

The term "and/or" is additionally or alternatively.

The terms loading, accessing, providing, unloading are used in an interchangeable manner.

There may be provided adaptors such as a static adaptor and/or a movable adaptor that may support a box and ease the upload of the box to a robot and ease the download of the box from the robot.

The adaptors may fit a robot interfacing element of the robot. The robot interfacing element may be a gripper, a holder, a fork, and the like.

Any static or movable adaptor may be implemented in warehouse that may be managed in any of the methods illustrated below or by any other method. For example—the any static or movable adaptor may be implemented in a warehouse that uses multiple types of robots (for example first and second robots), only a single type of robot, and the like.

There may be provided a method for managing a warehouse. The method may include loading, by one or more robots, boxes to one or more storage units, wherein the boxes are provided from one or more interfacing units that may be manned or automated. The method may include unloading, by one or more robots, boxes from one or more storage units, the boxes are provided to one or more interfacing units that may be manned or automated.

At the one or more storage units the boxes may be positioned on static adaptors that may be fixed to the shelves of the one or more storage units.

Alternatively—at the one or more storage units the boxes may be positioned on movable adapters that may move with the boxes.

Any of said static adaptors and/or movable adaptors may be of a same shape and/or size.

The robots that may load and unload the boxes may be of the same type of different types.

For example—the robots may include first robots that are compact and may move beneath the bottom shelves of the storage units—thereby dramatically saving time required tor each the boxes of the bottom shelves of the storage units. The first robots may be simple (for example only lower and elevate a fork—especially over a limited height range)—thereby reducing the cost of the first robots.

Yet for another example—the robots may include second robots that are bigger and may reach boxes of higher shelves of the storage units. The second robots may also participate in the rearrangement of the boxes within the shelves so that boxes of interest may be positioned at the lowest shelves of the storage units.

FIG. 1 illustrates an example of method 900.

Method 900 is for retrieving content stored in a warehouse.

Method 900 may include step 910 of maintaining first content in boxes of a lowest shelf of a storage unit of the warehouse, while maintaining in boxes of higher shelves of the storage unit second content that is of less interest than the first content.

The interest associated with the boxes may be determined in any manner. For example—the interest may be based on previous demands to the content within the boxes, based on future orders for content, may be based on expected content retrieval patterns, and the like. The determining of interest may be done in a repetitive manner, in a pseudo random manner, based on retrieval statistics, based on malfunctions, and the like. The determining of interest may be valid for a certain period—for example for a day, for one or more hours, and the like.

The maintaining may include (a) replacing at least one box from the lowest shelf by at least one box from one of the higher shelves, (b) allocating one or more first robots to receive boxes of interest from the one or more interfacing units, (c) allocating one or more second robots to receive boxes of less interest from the one or more interfacing units.

The replacement of boxes may be executed by one or more second robots and/or by another entity.

Method 900 may also include steps 920 and 930.

Step 910 may be executed in parallel to steps 920 and 930, or in a sequential manner. For example—step 910 may be executed during a night shift while steps 920 and 930 may be executed during the day.

Step 920 may include accessing one or more boxes of one or more lowest shelves of one or more storage units of the warehouse and providing the one or more boxes to one or more interfacing units of the warehouse, by one or more first robots. A storage unit includes multiple shelves. The shelves can be connected to a frame that may include legs or other structural elements.

Step 920 may also include providing, by the one or more first robots, one or more boxes to one or more lowest shelves of the one or more storage units. The one or more boxes are provided from the one or more interfacing units of the warehouse.

Step 930 may include accessing one or more boxes of higher shelves of the one or more storage units and providing the one or more boxes to the interfacing units, by one or more second robot. In each storage unit the higher shelves are higher than the lowest shelf.

Step 930 may also include providing, by the one or more second robots, one or more boxes to one or more higher shelves of the one or more storage units. The one or more boxes are provided from the one or more interfacing units of the warehouse.

The first robot may have a lower position in which the first robot is lower than when the first robot is positioned in an higher position. When in higher position a robot interfacing element of the first robot is lifted and when in the lower position the robot interfacing element is lowered.

The first robot, when positioned at a lower position, is lower than a height of the lowest shelf—which enables the first robot to move under the lowest shelves of the storage units.

The height of the first robot when in the lower position, may be less than 100, 90, 80, 70, 60, 50 centimeters.

The second robot is higher than the height of the lowest shelf.

The warehouse may include multiple storage units and the one or more first robots may move below the lower shelves of the storage units while the one or more second robots may move in pathways formed between the storage units.

The storage units may be arranged in long and narrow rows, and the movements of the first robots below the lower shelves of the storage units may be very effective and save even more than 50% of the access time.

Step 920 may include: (a) reaching the storage unit by moving below the lowest shelf, (b) lifting the robot interfacing element of the first robot, (c) moving the first robot in relation to the box thereby inserting the robot interfacing element in a gap between a surface of the lower shelf and a bottom of the box; (c) lifting the box by the robot interfacing element; and (d) moving the first robot with the box away from the lower shelf.

The box may be positioned on a static adaptor that is connected to the lowest shelf.

The static adaptor may include spacers that may be configured to elevate the box above a surface of the lowest shelf while maintaining at least a portion of the surface untouched—to provide the gap through which the robot interfacing element enters.

The static adaptor may include stoppers (located at the back of the lowest shelf) for preventing the boxes from slipping backwards.

The static adaptor may include one or more intermediate element that split a gap formed between a bottom of a box, surface of the lowest shelf and a pair of spacers. This may provide multiple smaller gaps—each may fit to a single finger of the robot interfacing element.

The spacers and the intermediate element may act as guiding means for guiding the robot interfacing element of the robots.

Step 920 may include lowering the robot interfacing element (that supports the box) when (or after) the first robot is spaced apart from the lower shelf.

The insertion of the robot interfacing element may involve inserting some parts of the second robot below the lower shelf.

Step 920 may be executed without rotating the robot interfacing element in relation to a housing of the first robot. For example—the only change in the spatial relationship between the housing and the fort may involve lifting the robot interfacing element.

When the adaptor is a movable adaptor then step 920 may include (a) reaching the storage unit, (b) lifting the robot interfacing element of the first robot, (c) moving the first robot in relation to the box thereby inserting the robot interfacing element in a gap between a surface of the lower shelf and a bottom of the movable adaptor that supports the box; (d) lifting the box and the movable adaptor by the robot interfacing element; and (e) moving the robot with the box and the movable adaptor away from the lower shelf.

The movable adaptor may include legs, a base supported by the legs and sidewalls that extend above the base.

Step 910 may include populating boxes of lowest shelf that are expected to be accessed during next time period. The next time period may be one or more hour long, more or more day long, shorter than an hour, and the like. Steps 920 and 930 may be executed during the next time period.

There may be provided a method that includes steps 920 and 930. When the boxes that are related to the lower shelfs are of higher interest than those stored in the higher shelves.

FIG. 2 illustrates method 100 that is executed by a first robot.

Method 100 includes:
a. Step 110 of driving the first robot inside the warehouse to a certain location. The driving may be along the most efficient path or a sub-optimal path. The certain location has coordinates X and Y and maybe Z—coordinate may be indictive of the lowest shelf or other shelf.
b. Step 120 of arriving to the certain location.
c. Step 130 of lifting the robot interfacing element of the first robot.
d. Step 140 of driving forwards while the robot interfacing element goes through a space defined between a shelf and a movable adaptor. If the adaptor is static then the gap is formed between the shelf and the box. Step 140 may include positioning the housing of the first robot below the lowest shelf.
e. Step 150 of lifting the box and the movable adaptor. In case of a static adaptor only the box is lifted.
f. Step 160 of driving to a picking station (interfacing station in which the box is unloaded).
g. Step 170 of enabling the download of the box. For example accessing a certain location in the picking station.

Figure 3:
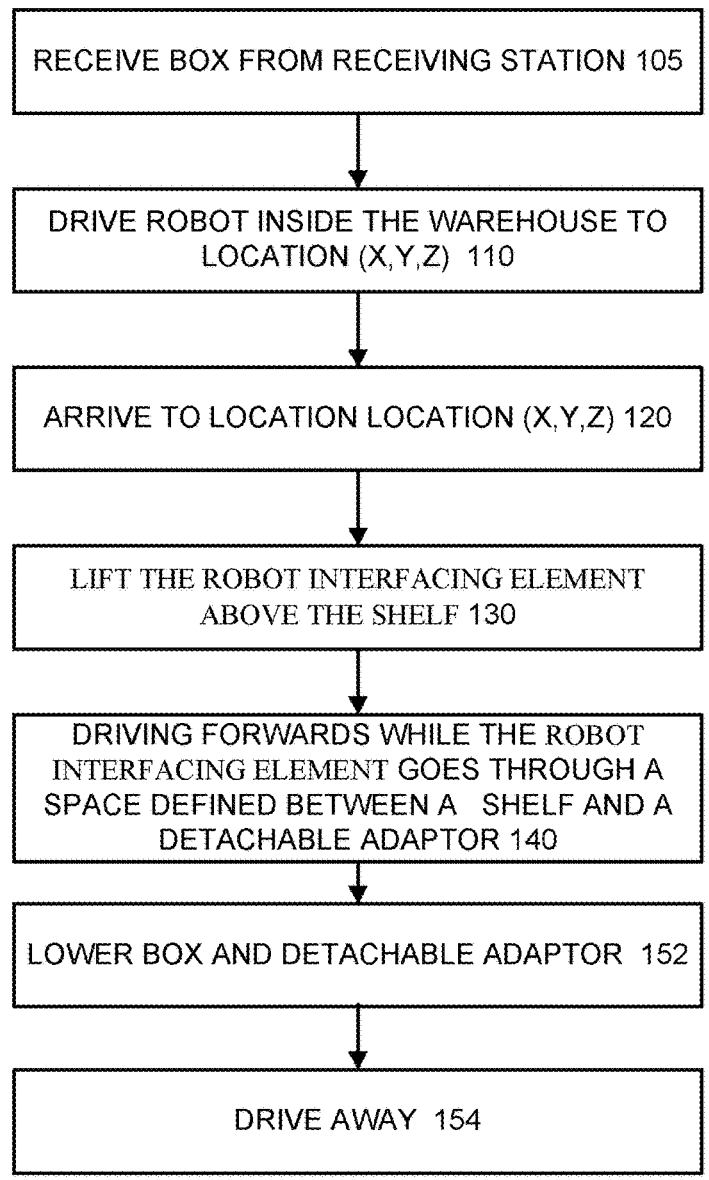
FIG. 3 is an example of a method.

FIG. 3 illustrates method 102 that is executed by a first robot.

Method 102 includes:
a. Step 105 of receiving a box from a receiving station. If there is a movable adaptor then receiving the box and the movable adaptor.
b. Step 110 of driving the first robot inside the warehouse to a certain location. The driving may be along the most efficient path or a sub-optimal path. The certain location has coordinated X and Y and maybe Z, Z may be indictive of the lowest shelf or another shelf.
c. Step 120 of arriving to the certain location.
d. Step 130 of lifting the robot interfacing element of the first robot.
e. Step 140 of driving forwards while the robot interfacing element goes through a space defined between a shelf and a movable adaptor. If the adaptor is static then the gap is formed between the shelf and the box. This may include positioning the housing of the first robot below the lowest shelf.
f. Step 152 of lowering the the box and the movable adaptor—thereby unloading the box and the movable adaptor. In case of a static adaptor only the box is unloaded.
g. Step 154 of driving away.

Figure 4:
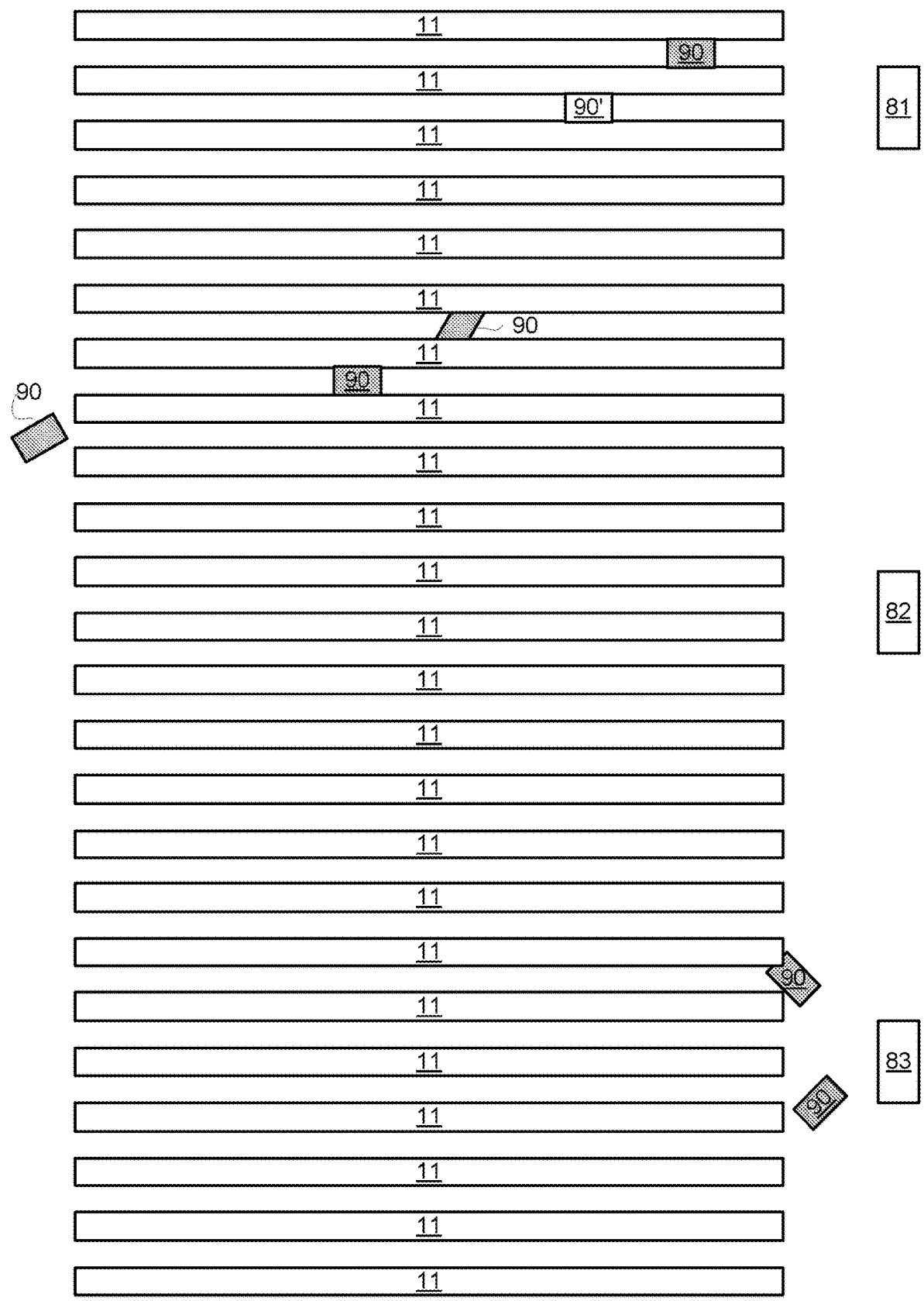
FIG. 4 is an example of a warehouse.

FIG. 4 illustrates an example of a warehouse. Multiple storage units 11 are arranged in long rows. Each storage unit may have one or more segments—that are virtually defined by legs of other structural elements that support the shelves. First robots 90 and second robots 90' move in the warehouse. Second robots 90' move within pathways between storage units 11 while the first robots 90 may move in the pathways and below the storage units. FIG. 4 also illustrates interfacing units 81, 82 and 83 for receiving and/or providing boxes. The interfacing units may act as picking units and/or providing units.

Figure 5:
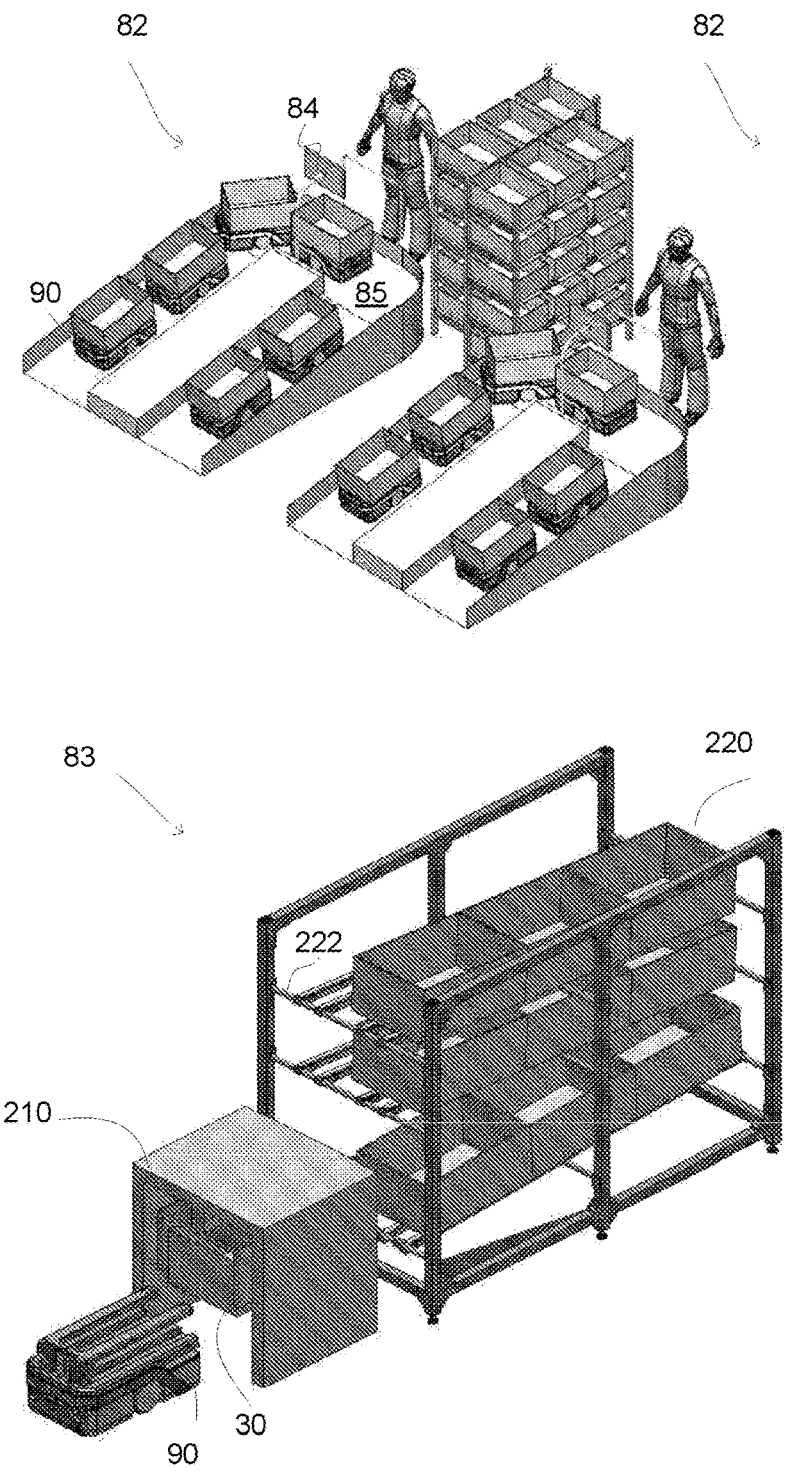
FIG. 5 illustrates an example of first robots, interfacing stations and a bridge unit.

FIG. 5 illustrates two interfacing units 82. These two interfacing units are manned by operators that may select which box to receive. In FIG. 5 the interfacing units are picking units for picking boxes, provided by first robots, from the lower shelves of storage units.

Each interfacing unit includes a ramp 84 that defines a U shaped path. The ramp allows first robots to elevate themselves from the floor to a higher access point in which they can be accessed by an operator. The operators may order boxes using a computerized system 85.

The ramp is merely an example of the interfacing unit.

The first robots, after downloading the boxes may exit the station and be assigned a new task.

It should be noted that when the interfacing unit acts as both a receiving unit and a picking unit then the first robots may be loaded with new boxes.

Multiple first robots may be positioned simultaneously on the ramp—thus allowing the ramp to act as a buffer.

FIG. 5 also illustrates a part of an interfacing unit 83 that acts as a receiving unit in which a first robot 90 receives a single box from a bridge unit 210 that is fed by buffer 220 that stores multiple boxes. The first robot may open the bridge unit if the bridge unit is locked. After the first robot receives the box, and if another box should be picked by a robot—the buffer 220 feeds the buffer unit with a new box. The buffer 220 may have any shape and size and may fill the bridge unit in an manner. FIG. 5 illustrates that the buffer includes oriented shelves.

Figure 6:
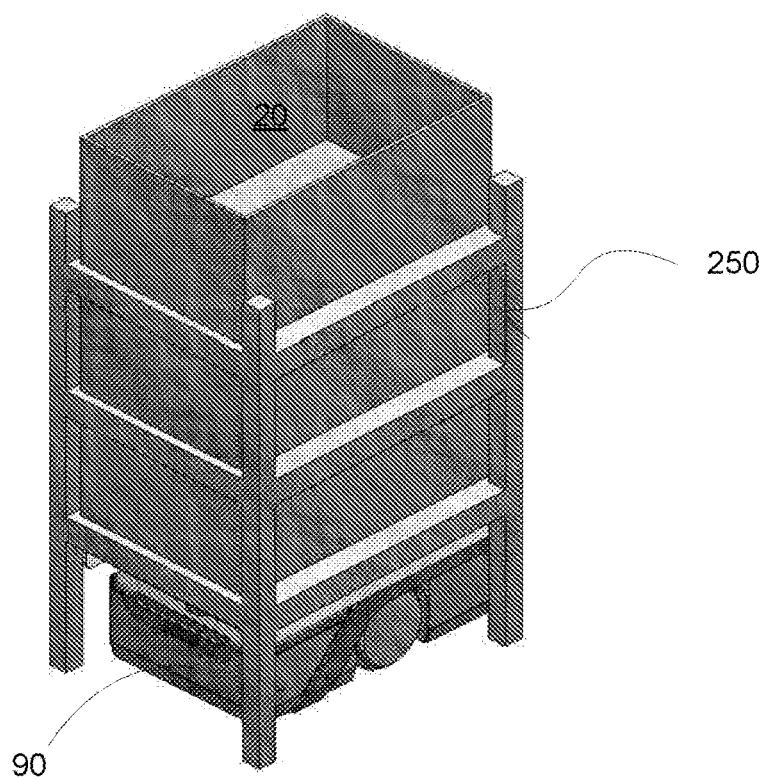
FIG. 6 illustrates an example of a first robot and a static adaptor.

FIG. 6 illustrates an example of an extension that allows first robot 90 to convey multiple boxes at once.

The upper structure of the first robot may include a handle for the extension for safe driving and reliable interfacing with the receiving station.

Adaptors

The static adaptors may include guiding means such as tunnels that may fit the robot interfacing element of a robot (or at least the end of that robot interfacing element).

The static adaptors, when connected to shelves, may form a continuous or non-continuous sequence of static adaptors.

The static adaptors may support the boxes—but the boxes should not block the tunnels.

A static adaptor can be rigid or not. The static adaptor can be made of various materials such as but not limited to plastic and may comply with various regulations that are related to the logistics market (flame retardant, quantity and type of plastic material and thickness adjusted). A movable interface can be made of the same material as the static interface—or can be made of another material.

The static adaptors may allow robots to easily load and unload the inventory. The static adaptors may be fastened to existing flat shelves—and there is no need in replacing the entire infrastructure of the warehouse.

The static adaptor and the robot interfacing element may fit each other and the robot interfacing element may be provided so that any kind of box which located on a static adaptor can be pulled or pushed by the robot interfacing element. The gripper may include a mechanical mechanism that may include telescopic clamps that enter under a box (positioned on the static adaptor) and lift the box. Thanks to the static adaptor, the robot interfacing element can move within the tunnels of the static adaptor—and under each box and perform a pull/pull operation of the box.

Manual warehouses include shelves in different dimensions and location, aisles separated between the shelves and being roads for the robots. After the static adaptor are installed—every robots can get a mission to be in a specific location (x, y, z), when the robot arrived he may load or unload a box from the location.

Each static adaptor may be designed to: (a) customizes box's location on the shelf for the robot interfacing element, (B) separate between the boxes.

In the manual industrial shelves market there are known players including Bito, Schaeffer, Stow, and Metalsistem.

Each of them has a different product catalog but with the same dimensions as height, depth and shelf width that are practiced in the professional market.

The static adaptors may dress on their existing products without the need for custom screwing or installations, and thus the suggested static adaptors have switched a system of shelving that is picked up by humans to be fully compiled by robots. Each of the companies above-mentioned has spars of various thicknesses and support elements of several types. The suggested static adaptor is suitable for every type and especially for the 1,300 mm and 1,500 mm shelf width category. Any other sizes of dimensions may be provided.

The static adaptor includes a spacer that support boxes while introducing a gap (for example 6 mm) between boxes. This assists in collision avoidance or friction. Any other sizes of dimensions may be provided.

The spacers may also create a "U" pattern between the boxes that being scanned by a side camera of a gripper. This element enable the robot to locate himself in front of the shelf at the relevant floor with an accuracy of up to (for example 2-3 mm). Any other sizes of dimensions may be provided.

The static adaptor allows access to the robot interfacing element's fingers at a depth of (for example 45 mm) below each box and thus can enter the paths of the robot interfacing element with a tolerance of up to (for example 20 mm). Any other sizes of dimensions may be provided.

The robot interfacing element's fingers can be made of materials designed to withstand friction against a counter-movement and resistance to an industrial environment.

Examples of dimensions of the robot interfacing element are width: 410 mm, length: 610 mm and height: 400 mm, below the specified size the gripper takes a tray on which the box is found in small sizes. Any other sizes of dimensions may be provided.

The first robot may have a side camera with a depth lens and short-range detection capability (for example 30 mm) and a fast reaction time that gives it the ability to position in front of a box with a precision of 2-3 mm (for example) on the drive axis and up to 10 mm on the height axis. Any other sizes of dimensions may be provided.

All this makes it possible to perform a complete pull and push of a box in any existing shelve frame with a static adaptor installed on it.

All of the above developments allow to pull and push a box in less than (for example) 7 seconds and perform more than (for example) 1,200 operations per day (2 shifts) with complete success.

Figure 7:
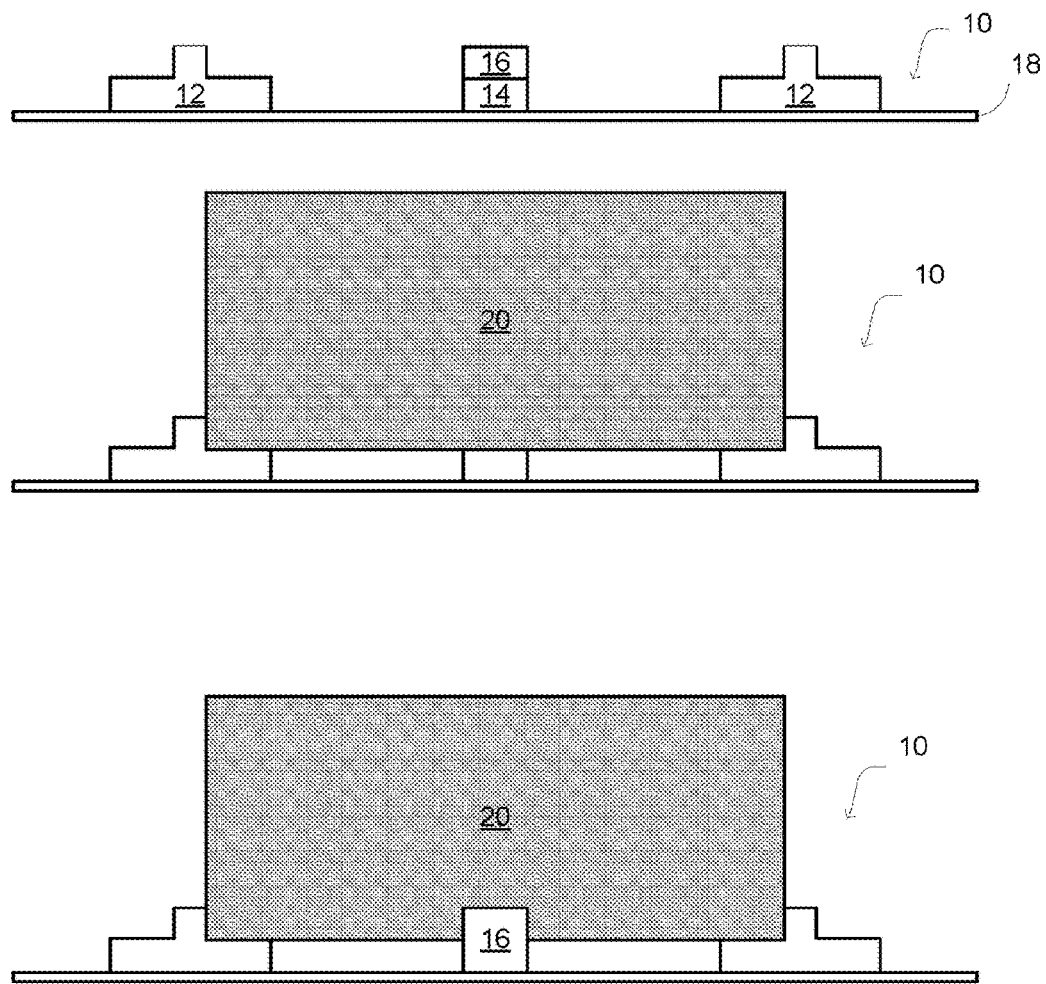
FIG. 7 illustrates an example of an adaptor.
Figure 8:
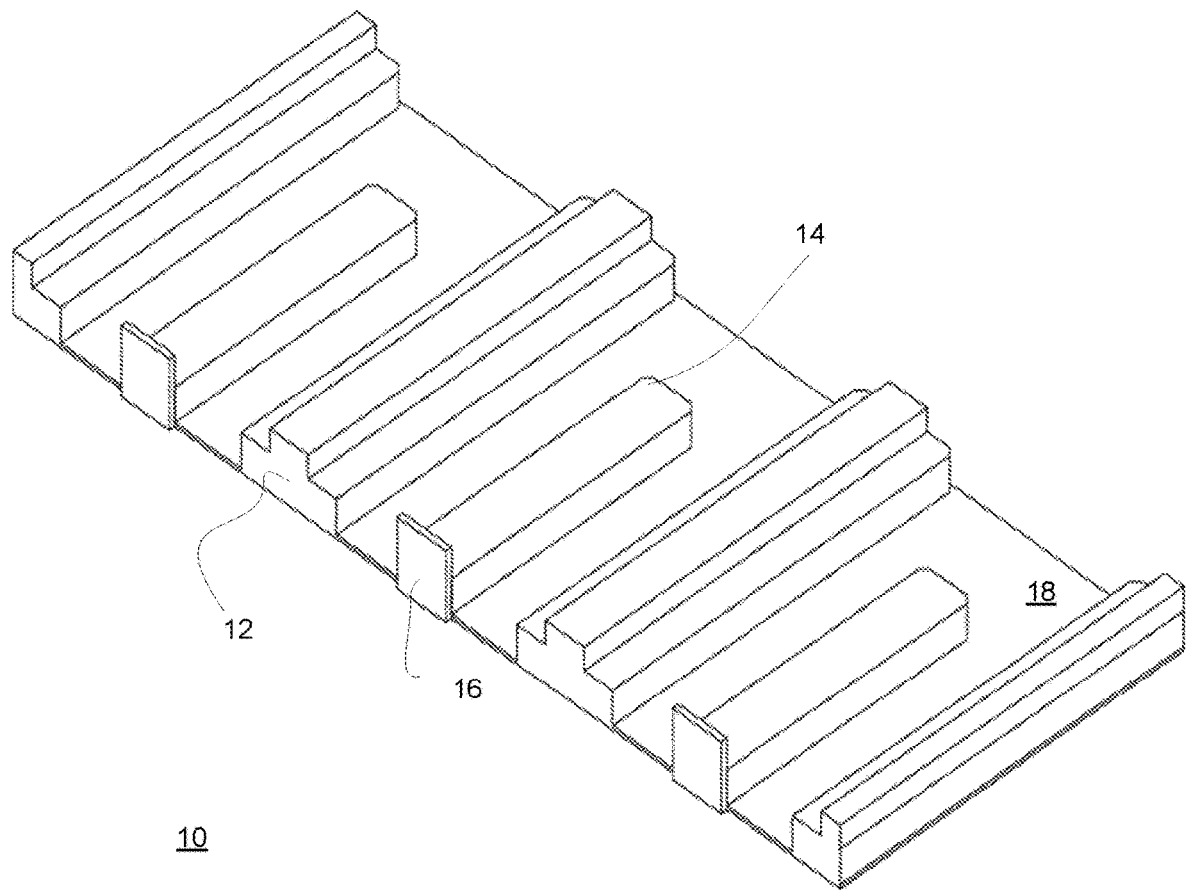
FIG. 8 illustrates an example of a static adaptor and a box.

FIGS. 7, 8 and 9 illustrate a shelf surface 18 and a static adaptor—both collectively denoted 10. The static adaptor includes spacers 12, intermediate element 14 and stoppers 16.

The spacers 12 are configured to elevate a box above surface 18 while maintaining at least a portion of the surface untouched—maintaining a gap through which a robot interfacing element can enter.

The stoppers 16 are for preventing the boxes from slipping backwards.

Intermediate element 14 splits a gap formed between a bottom of a box, surface of the lowest shelf and a pair of spacers. This provides two smaller gaps—one for each finger of a robot interfacing element.

FIGS. 7 and 9 also illustrated a box 20. FIG. 9 also illustrates a robot interfacing element 99 that elevates or lowers the box.

Figure 10:
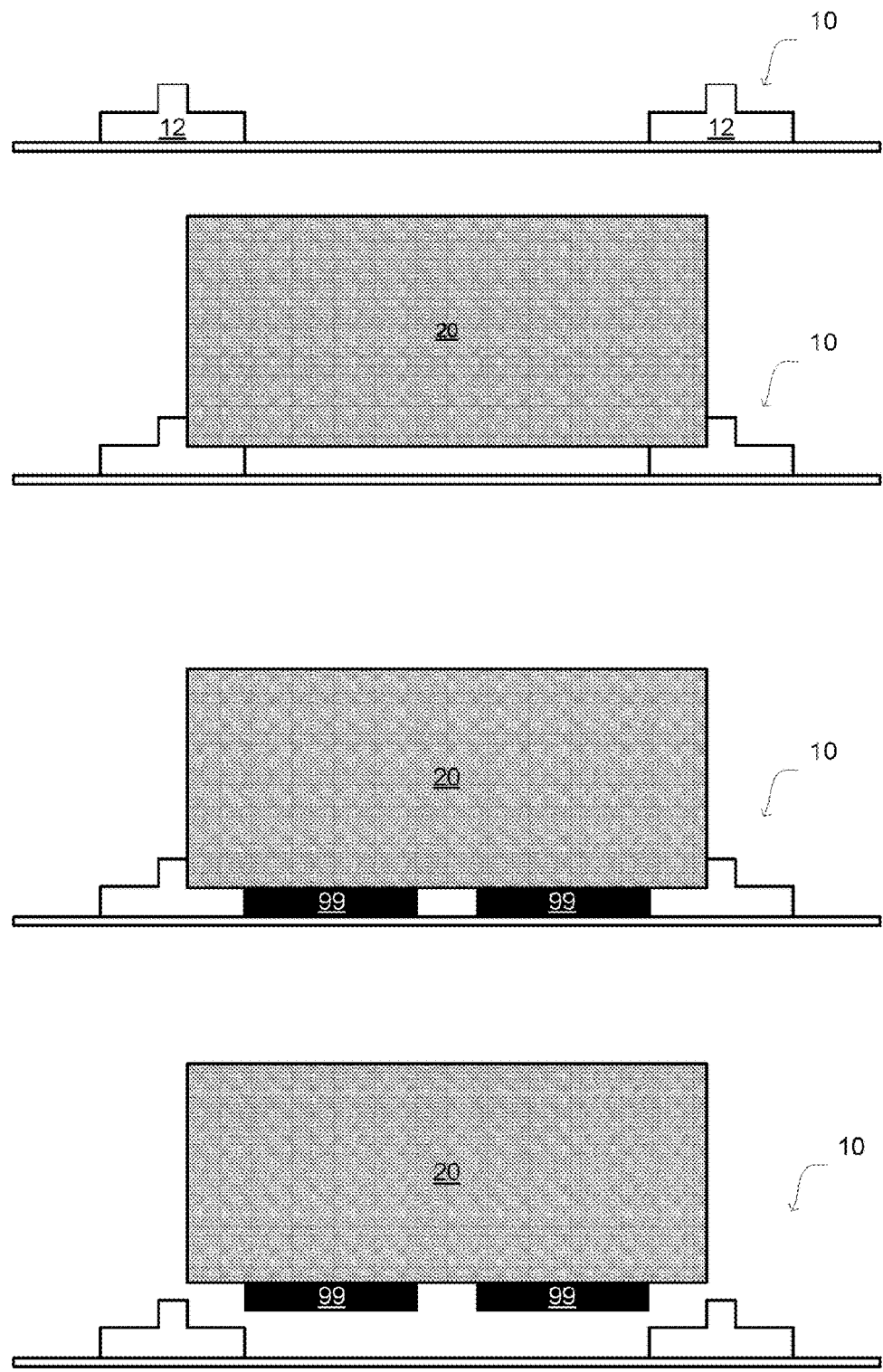
FIG. 10 illustrates an example of a static adaptor and a box that is lifted or lowered.

FIG. 10 illustrates an example of the static adaptor without the intermediate element.

Figure 11:
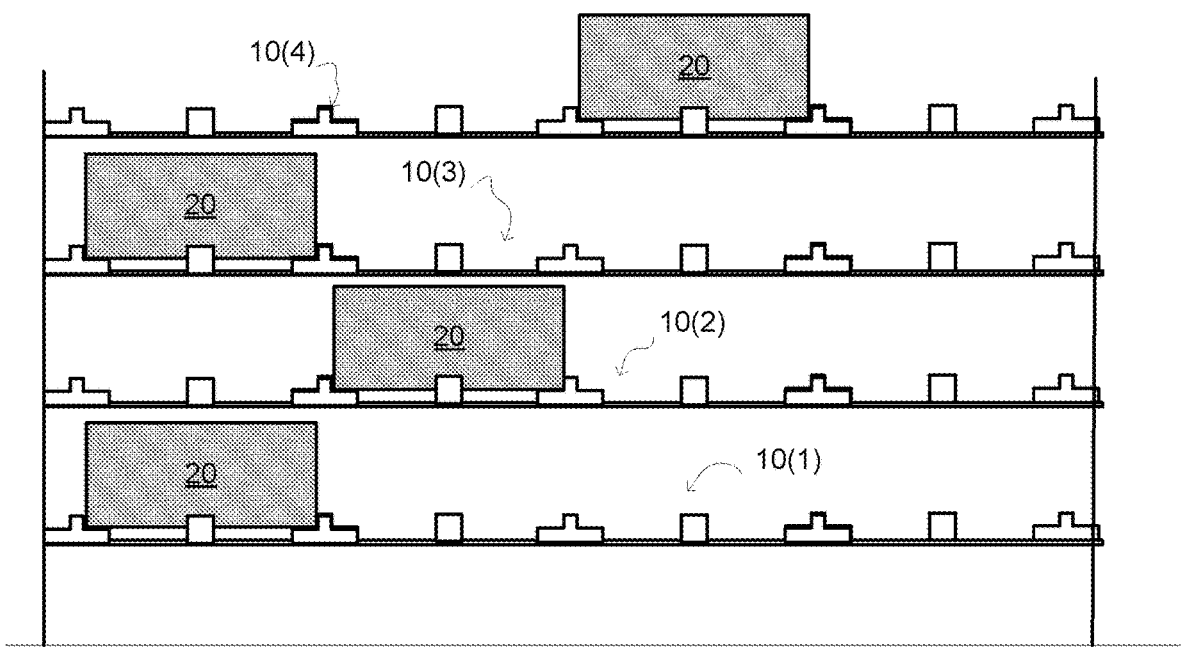
FIG. 11 illustrates an example of a storage unit equipped with static adaptors and boxes.
Figure 12:
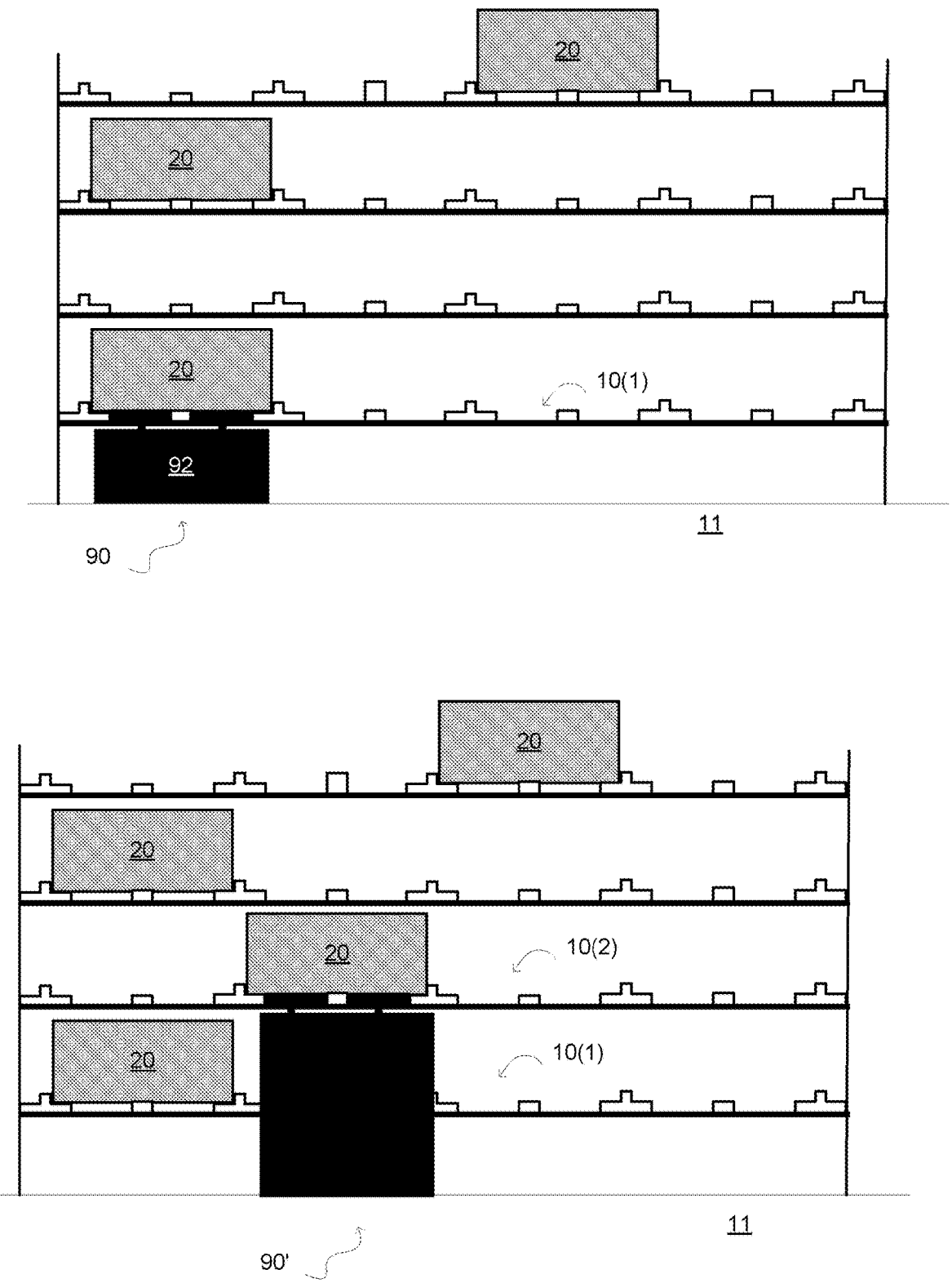
FIG. 12 illustrates an example of a storage unit equipped with static adaptors and boxes, a first robot and a second robot.

FIGS. 11 and 12 illustrate an example of a storage unit 11 that includes four shelves—a lowest shelf 10(1) and higher shelves 10(2)-10(4). The shelves are equipped with a static adaptor. FIG. 12 also illustrates an access of a box of the lowest shelf by a first robot and an access of a box of one of the higher shelves by second robot 90'.

Figure 13:
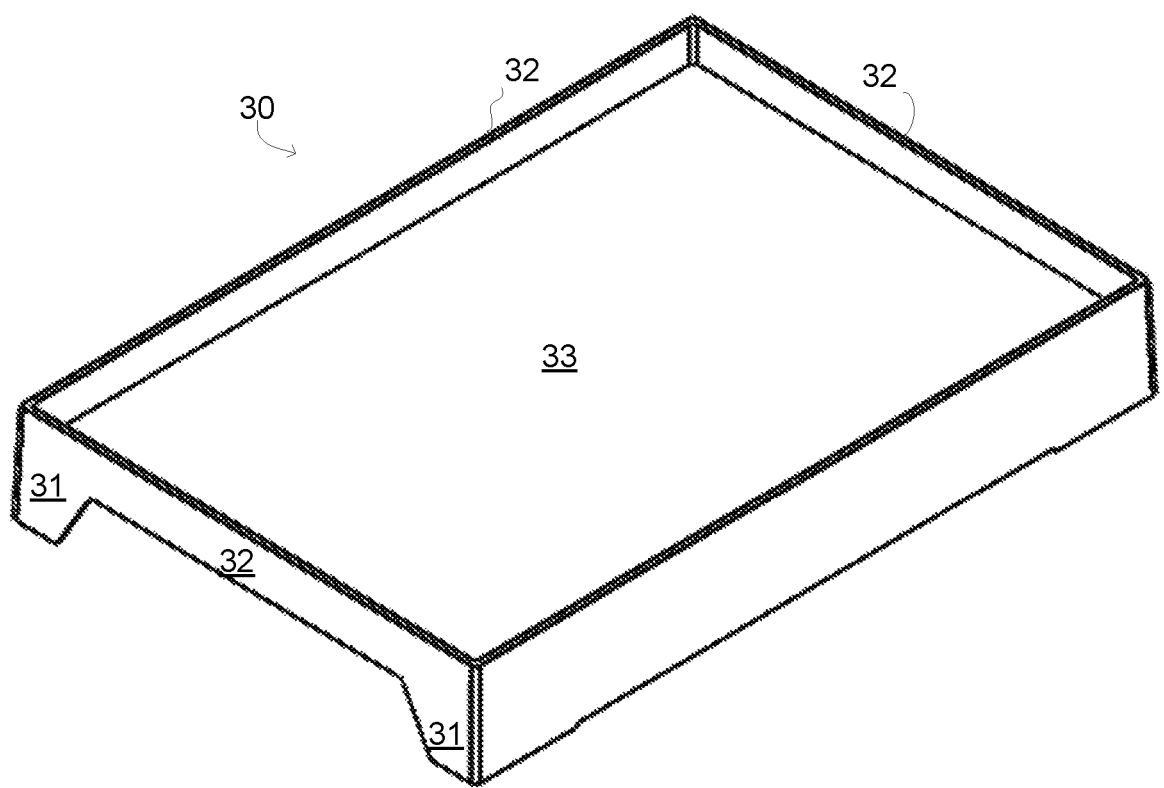
FIG. 13 illustrates an example of a movable adaptor.
Figure 16:
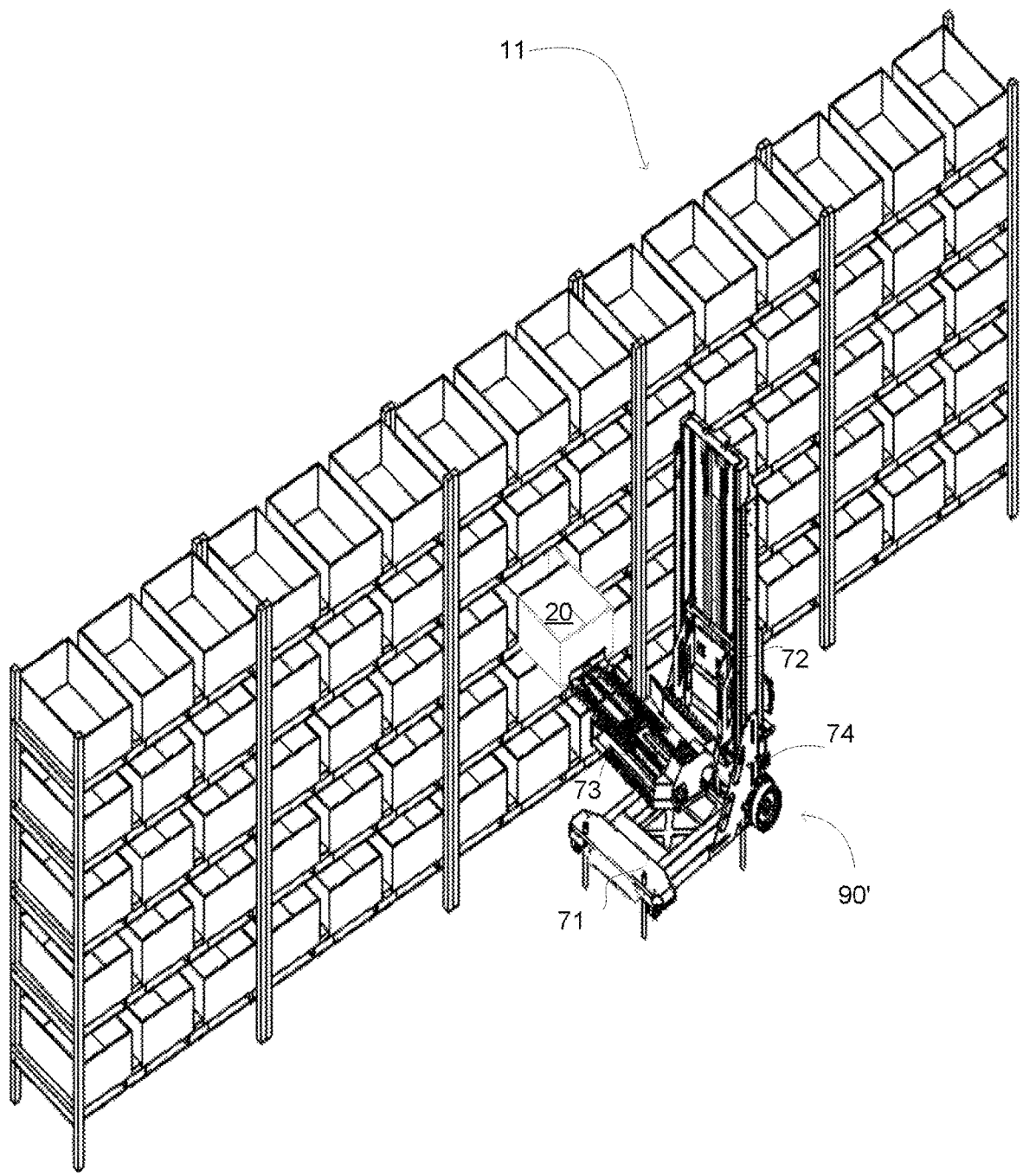
FIG. 16 illustrates an example of a second robot, a storage unit and boxes.
Figure 17:
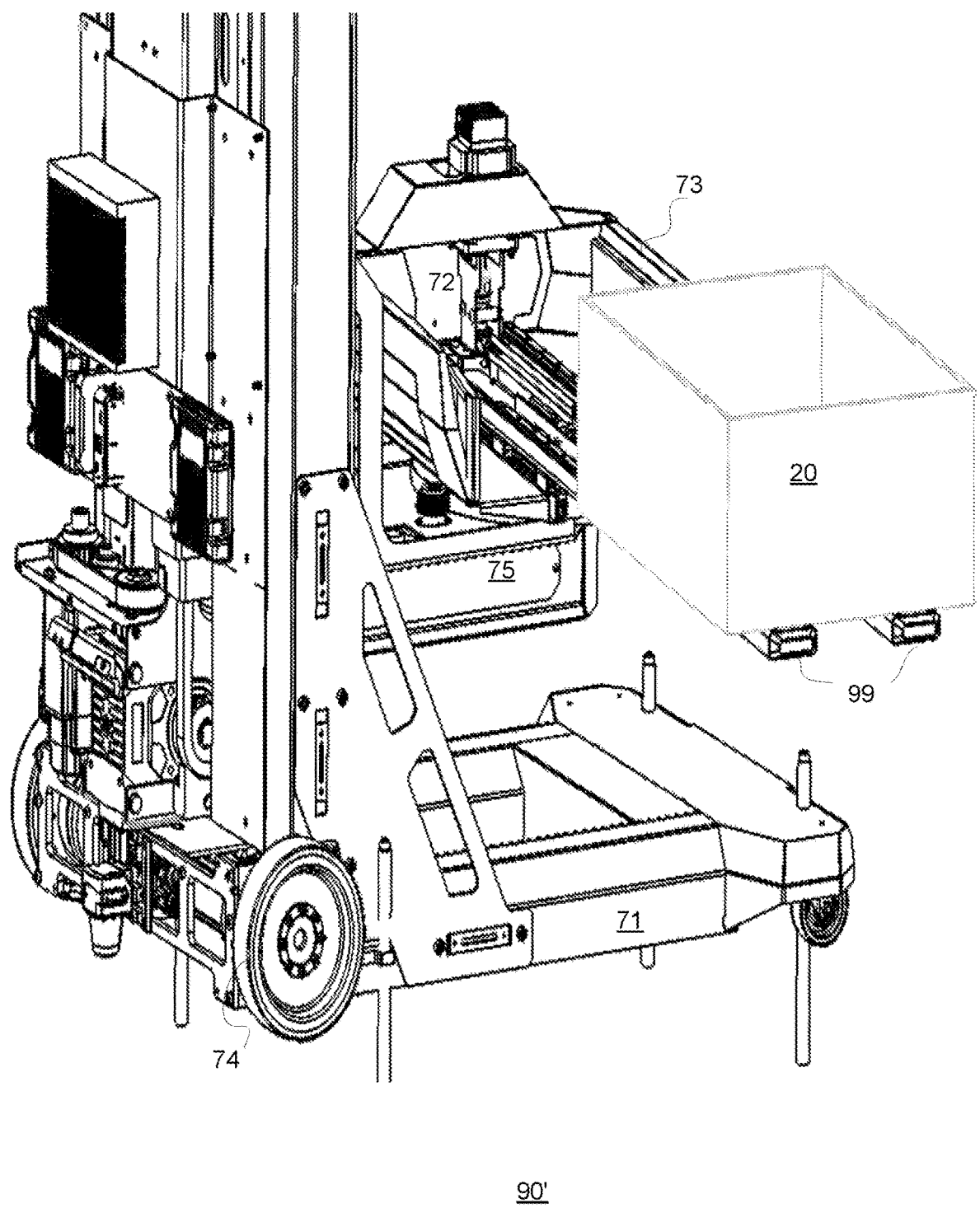
FIG. 17 illustrates an example of a second robot and a box.
Figure 18:
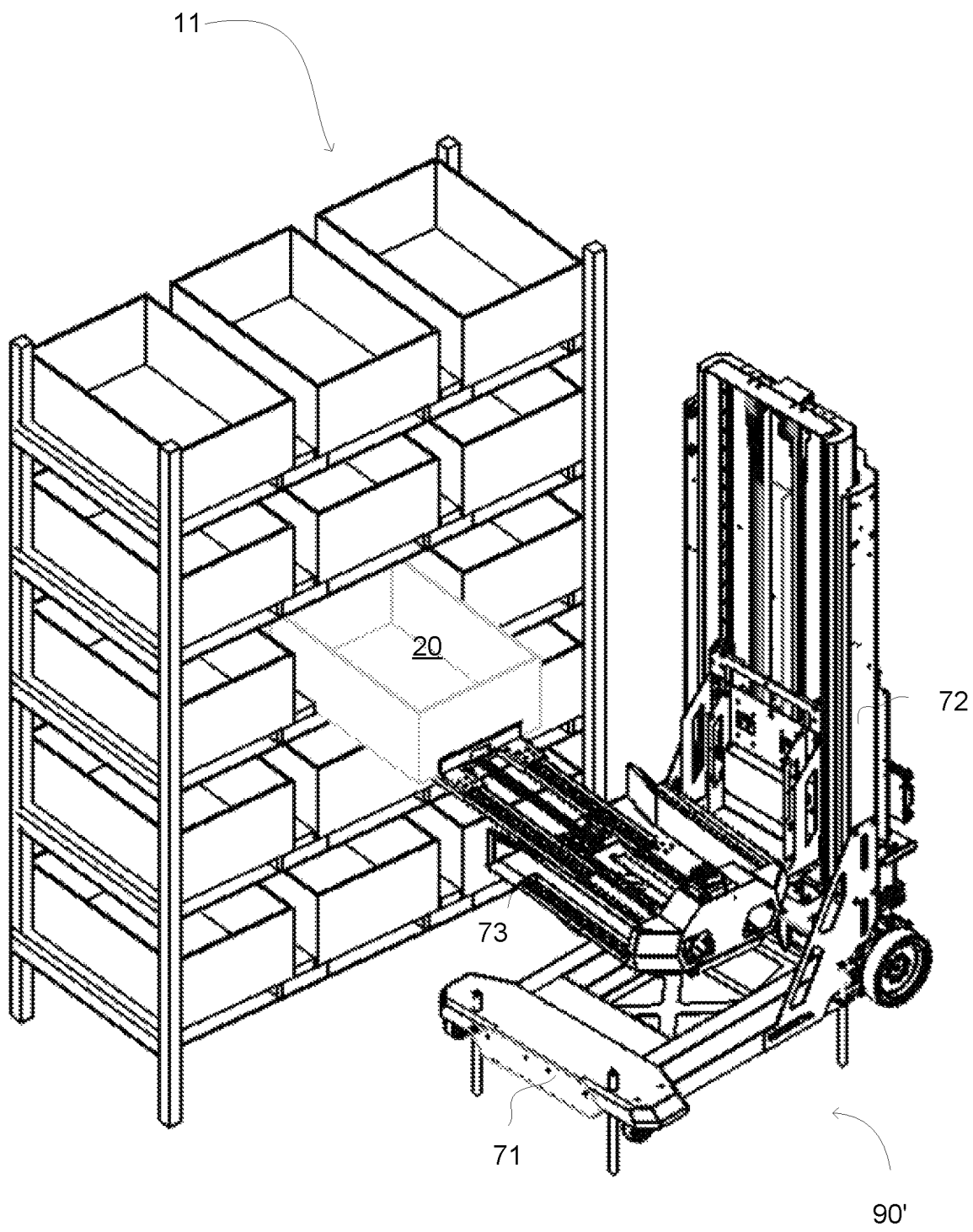
FIG. 18 illustrates an example of a second robot, a storage unit and boxes.
Figure 19:
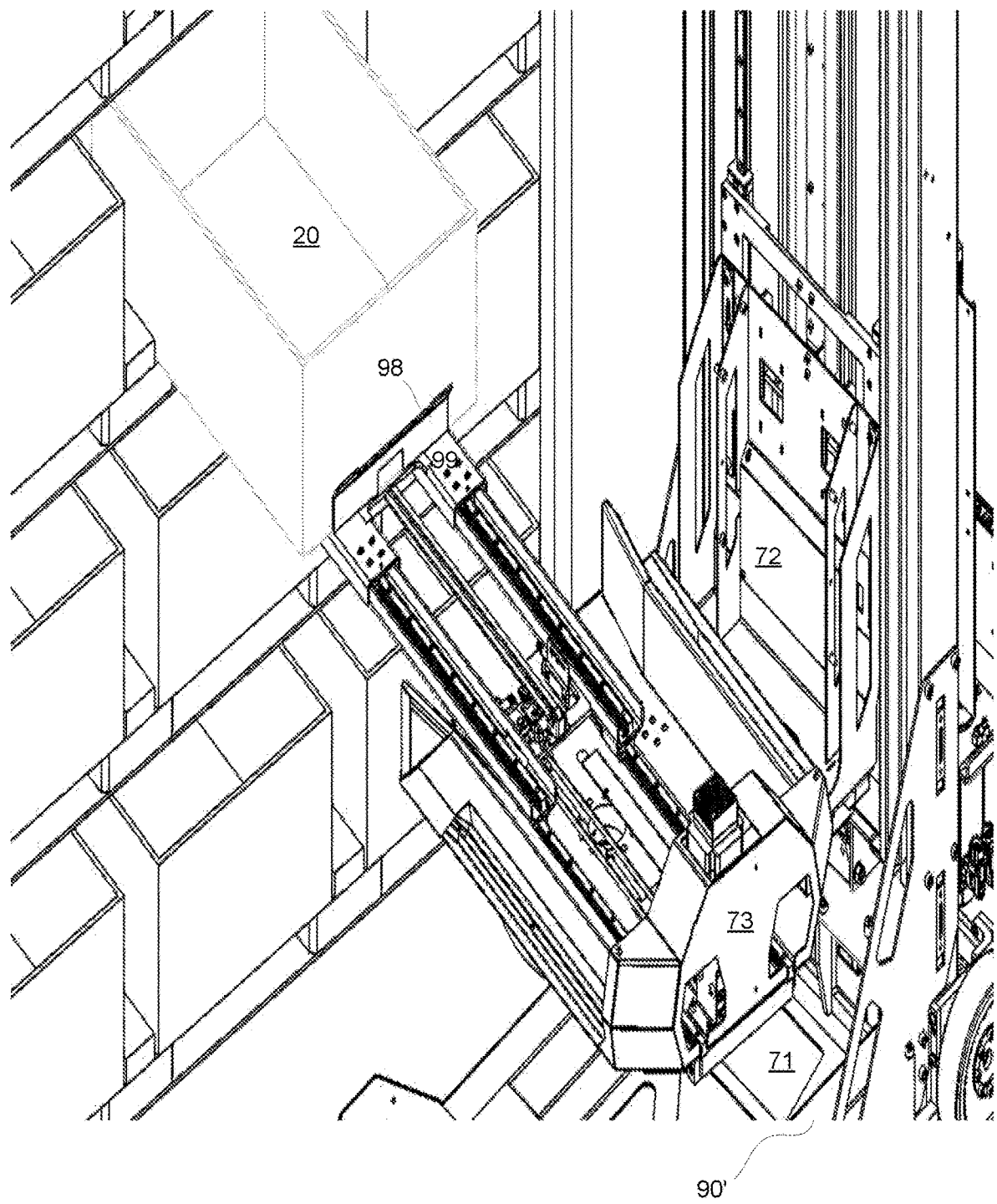
FIG. 19 illustrates an example of a second robot, a storage unit and boxes.
Figure 20:
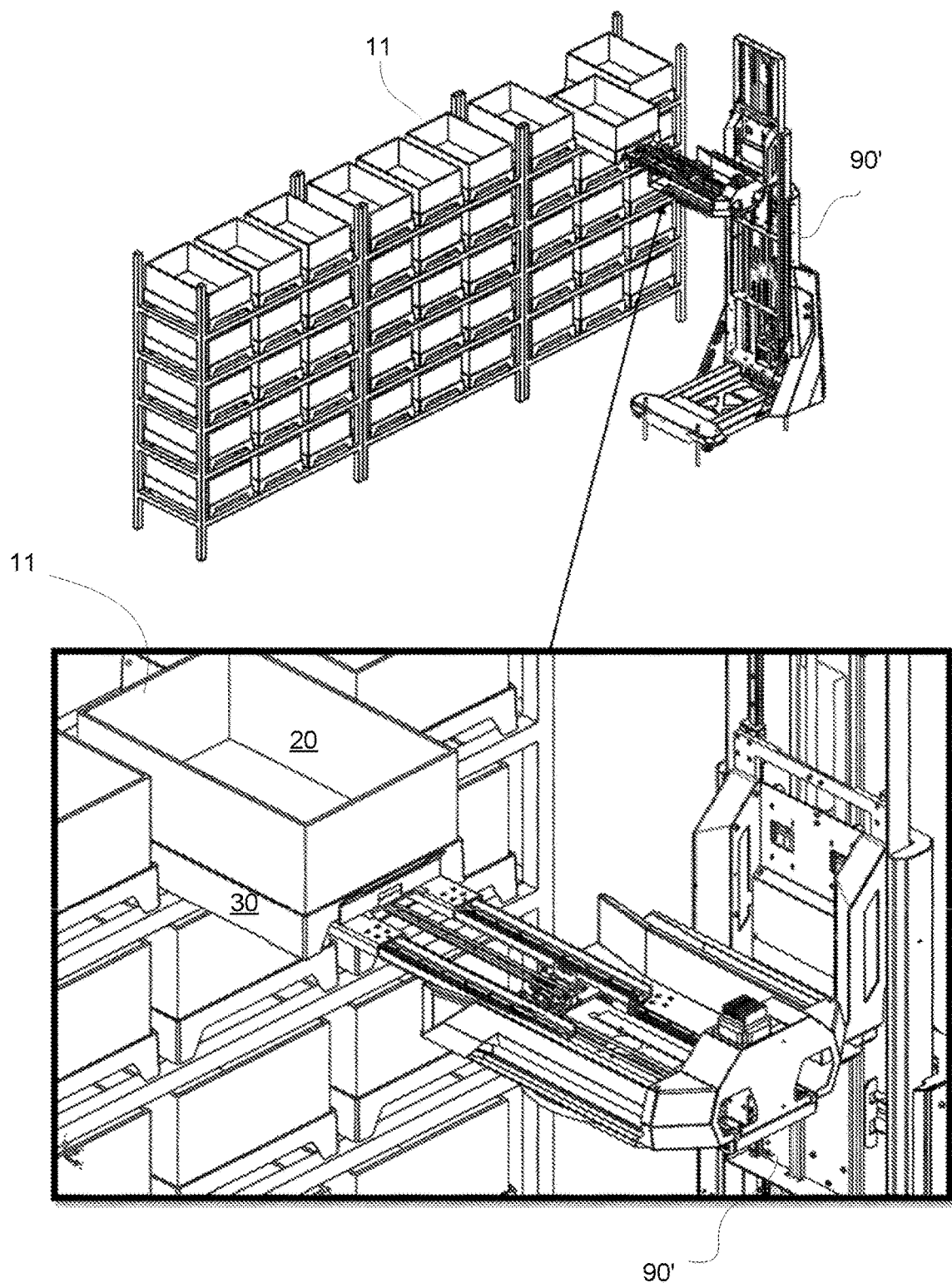
FIG. 20 illustrates an example of a second robot, a storage unit and boxes.
Figure 21:
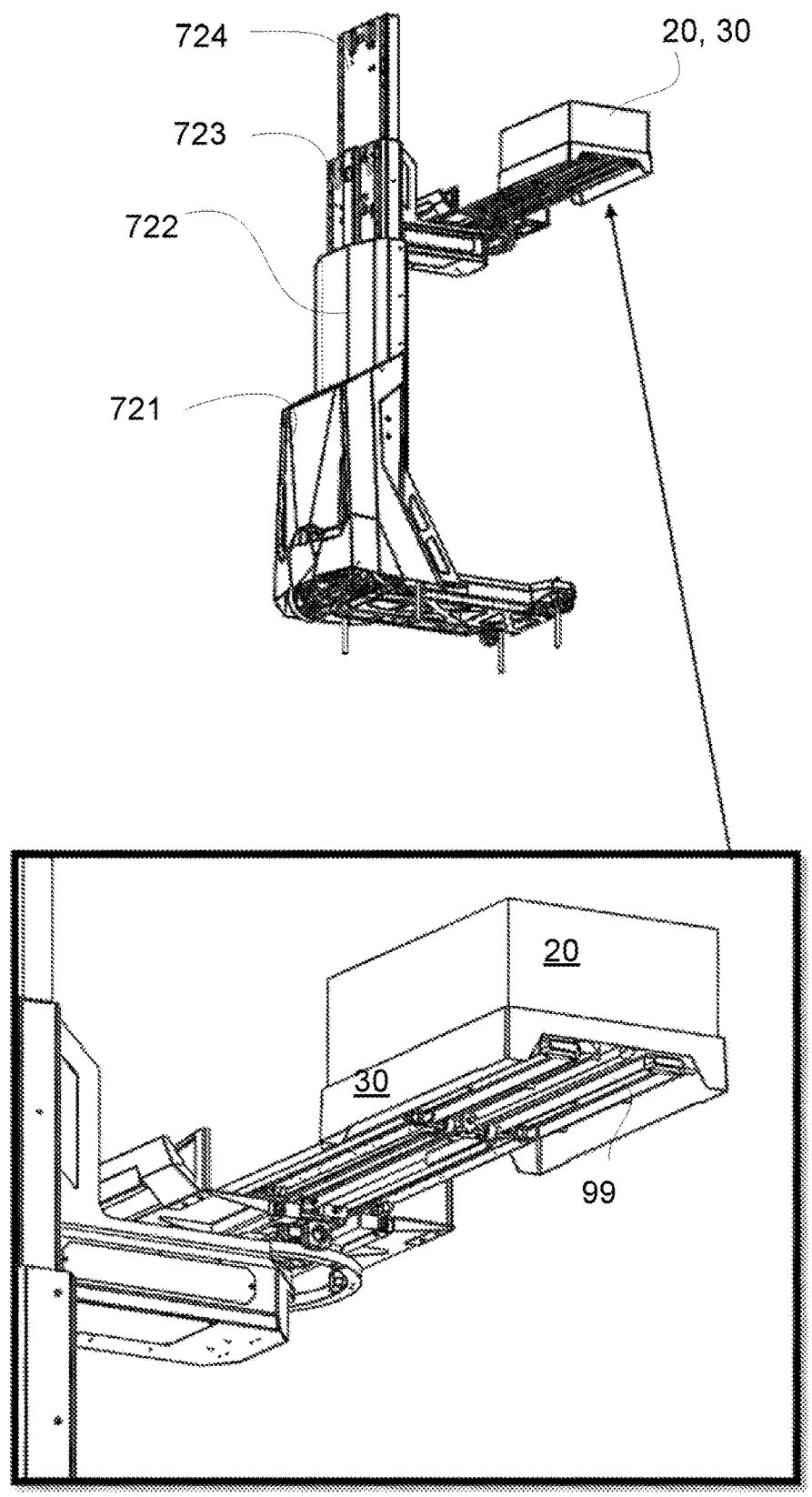
FIG. 21 illustrates an example of a second robot.
Figure 22:
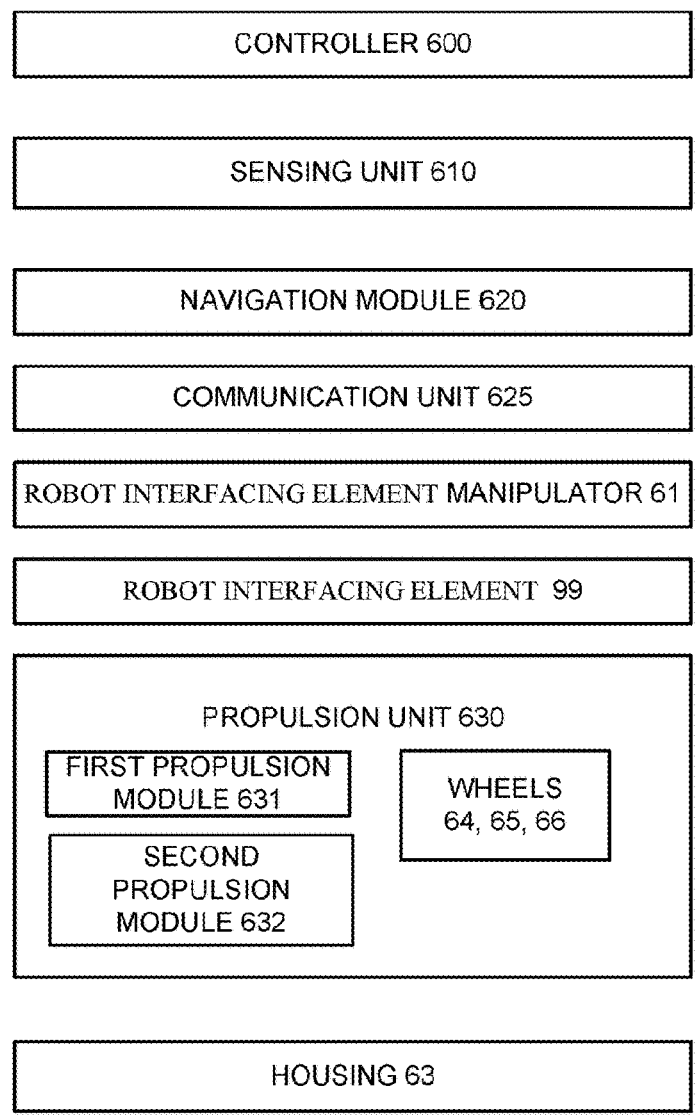
FIG. 22 illustrates an example of a first robot.
Figure 23:
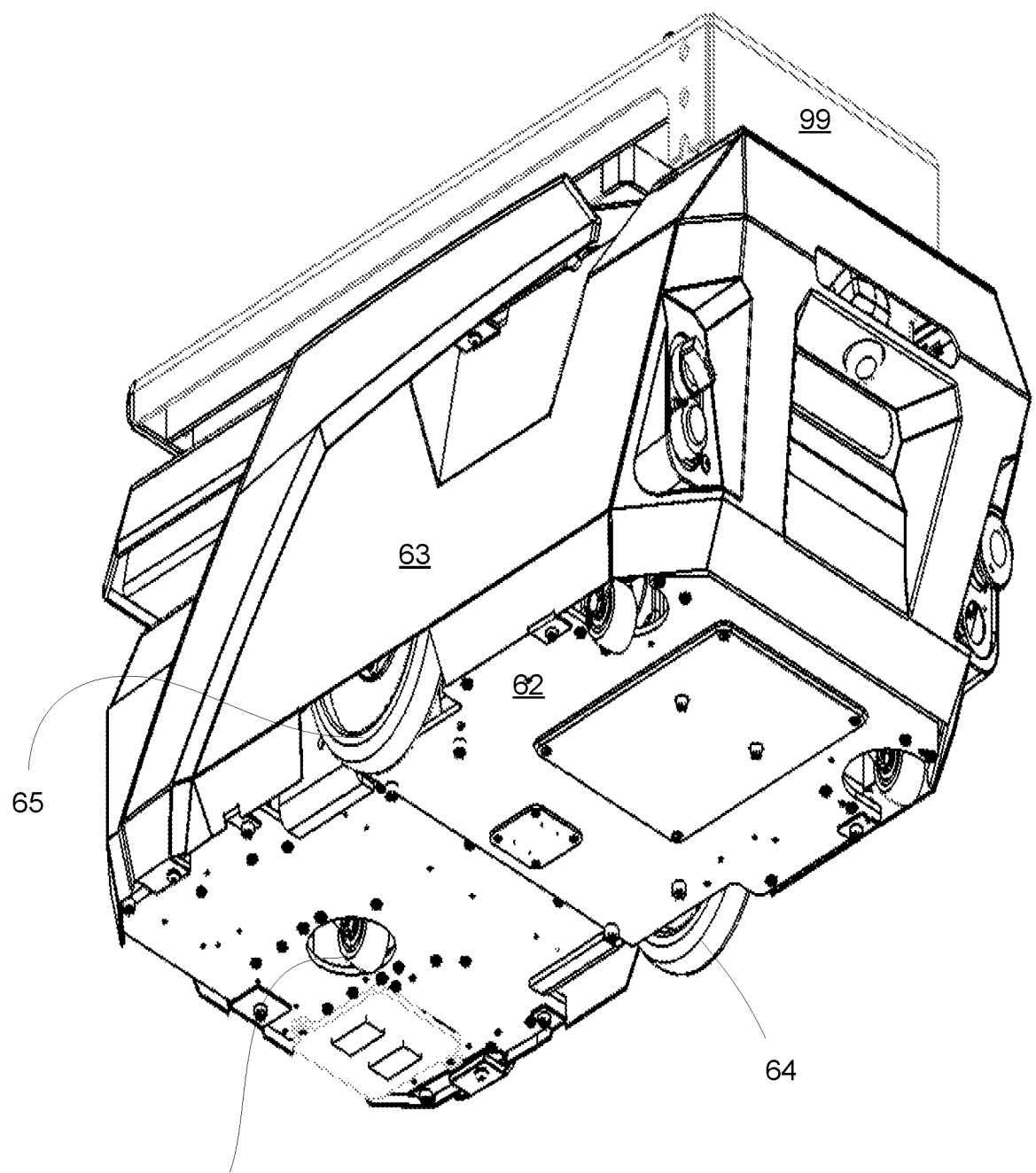
FIG. 23 illustrates an example of a first robot.

FIGS. 13, 14 and 15 illustrate an example of a movable adaptor 30.

The movable adaptor includes legs 31, a base 33 supported by the legs and sidewalls 32 that extend above the base to defined an open inner space that may receive a bottom of a box.

The movable adaptor may have other shapes as long as it include a part that supports the box while defining at least one gap with the shelf—that allows a robot interfacing element to enter.

FIG. 14 also illustrated a box 20 that is supported by the movable adaptor. FIG. 15 also illustrated a lowering or a lifting of the movable adaptor and a box by a robot interfacing element 99.

FIG. 16-21 illustrates a second robot 90' that loads a box (or a box with a movable adaptor) to an upper shelf of a storage unit 11 and/or unloads a box (or a box with a movable adaptor) from an upper shelf of a storage unit 11.

FIGS. 16-21 illustrate different adaptors—some illustrate a static adaptor while some illustrate a movable adaptor.

The second robot 90' may be bigger and more complex than the first robot. The second robot 90 may perform any movement (including rotation) during the loading and unloading process. The robot interfacing element may be vertically moved, horizontally moved, and rotated.

The second robot 90' is illustrated as including a base 71, vertical movement unit 72, horizontal movement unit 73 and propulsion unit 74. The horizontal movement unit 72 may be rotated in relation to the base 71. The vertical movement unit may be telescopic and may include multiple segments such as segments 721, 722, 723 and 724 of FIG. 21.

The second robot 90' may be a robot interfacing element lift or have robot interfacing element lift components and/or have robot interfacing element lift capabilities.

The second robot 90' may include a communication unit, a controller, one or more sensors, a navigation module, and the like.

The first robot may be configured to (a) follow the fast and optimal path for handling the boxes, (b) push or pull a box that interfaces with an adaptor (movable or static), (c) interface with interfacing units such as Picking/Receiving stations.

The dimensions (height, length and width) of the first robots can be defined so that the first robot may drive under each lowest shelf column throughout its total length (even near segments of a vertical supporting frame and between the segments). The first robot may be small enough to enable first robots to can pass under the same lowest shelf at the same time.

The robot interfacing element may be located outside the housing at all times. Alternatively—the robot interfacing element may be located within the housing when in lower position.

For example—the first robot may convey a 40 by 60 cm box, and may have a length and width that may slightly exceed these dimensions—for example have a length of 61.5 cm and a width of 41.5 cm. The dimension of the first robot may significantly deviate from the dimensions of the box.

The robot interfacing element height may be based on the dimension of the lowest shelf (height, depth and dimensions of the adaptor) and on the height of the first robot—as the first robot may carry the box on the top of its housing. For example—the robot interfacing element can can lift up to 200 mm and the height of the first robot may be about 24 centimeters. Other lifting heights and other first robot heights may be provided. Yet for another example—the robot interfacing element can reach about 600 mm in length under the box. Any other penetration depth can be provided.

Figure 24:
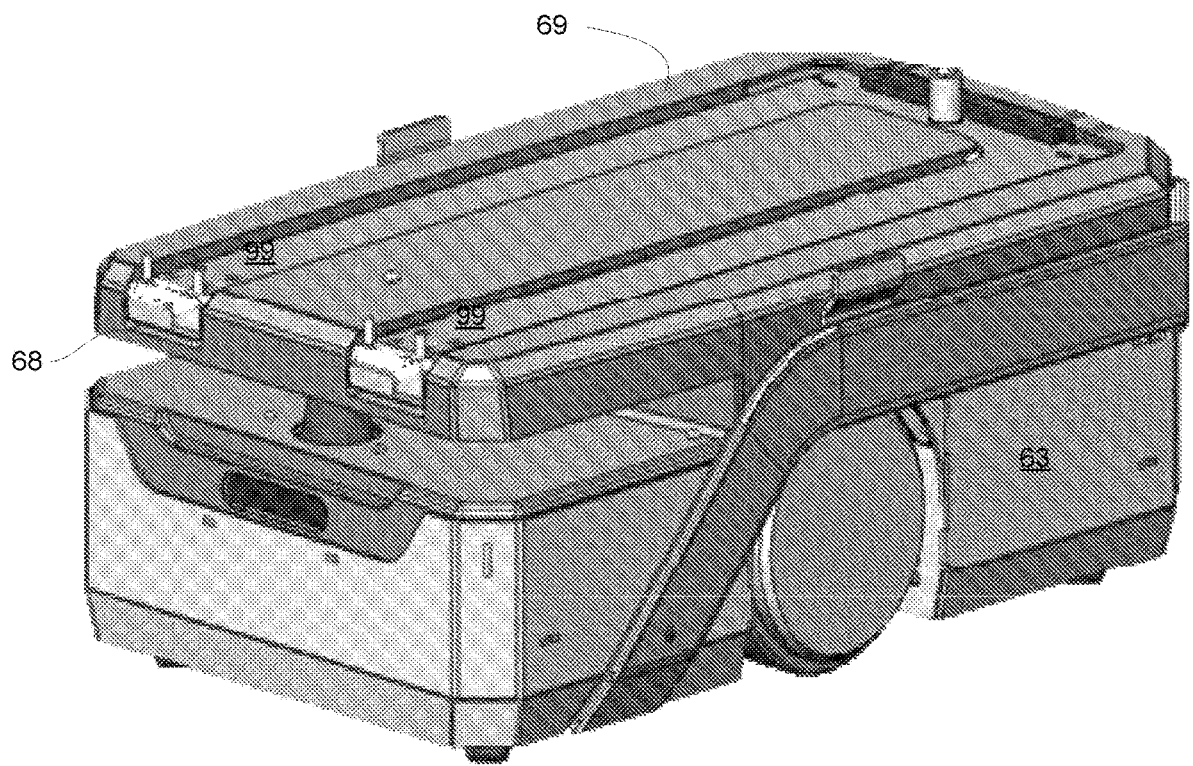
FIG. 24 illustrates an example of a first robot.
Figure 25:
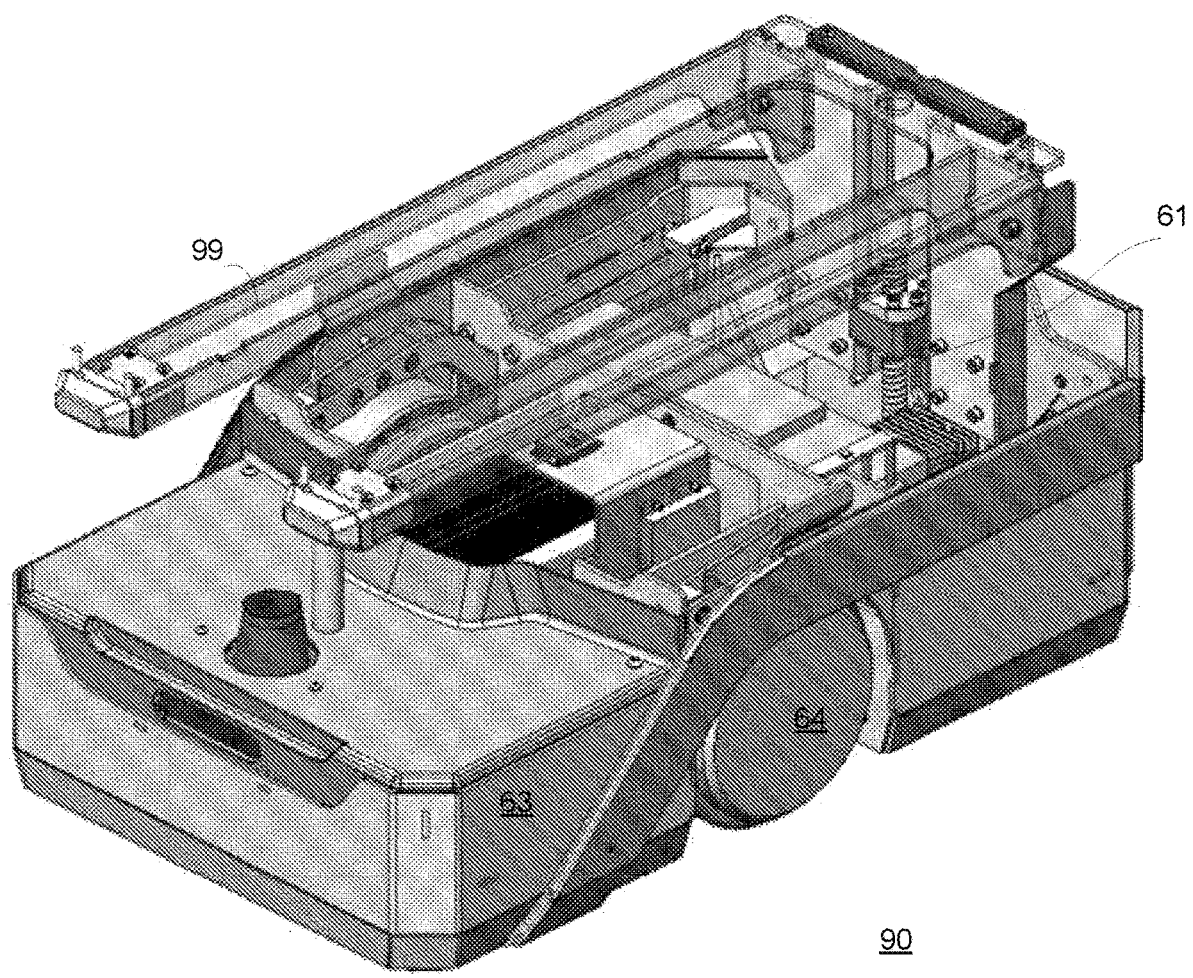
FIG. 25 illustrates an example of a first robot.
Figure 26:
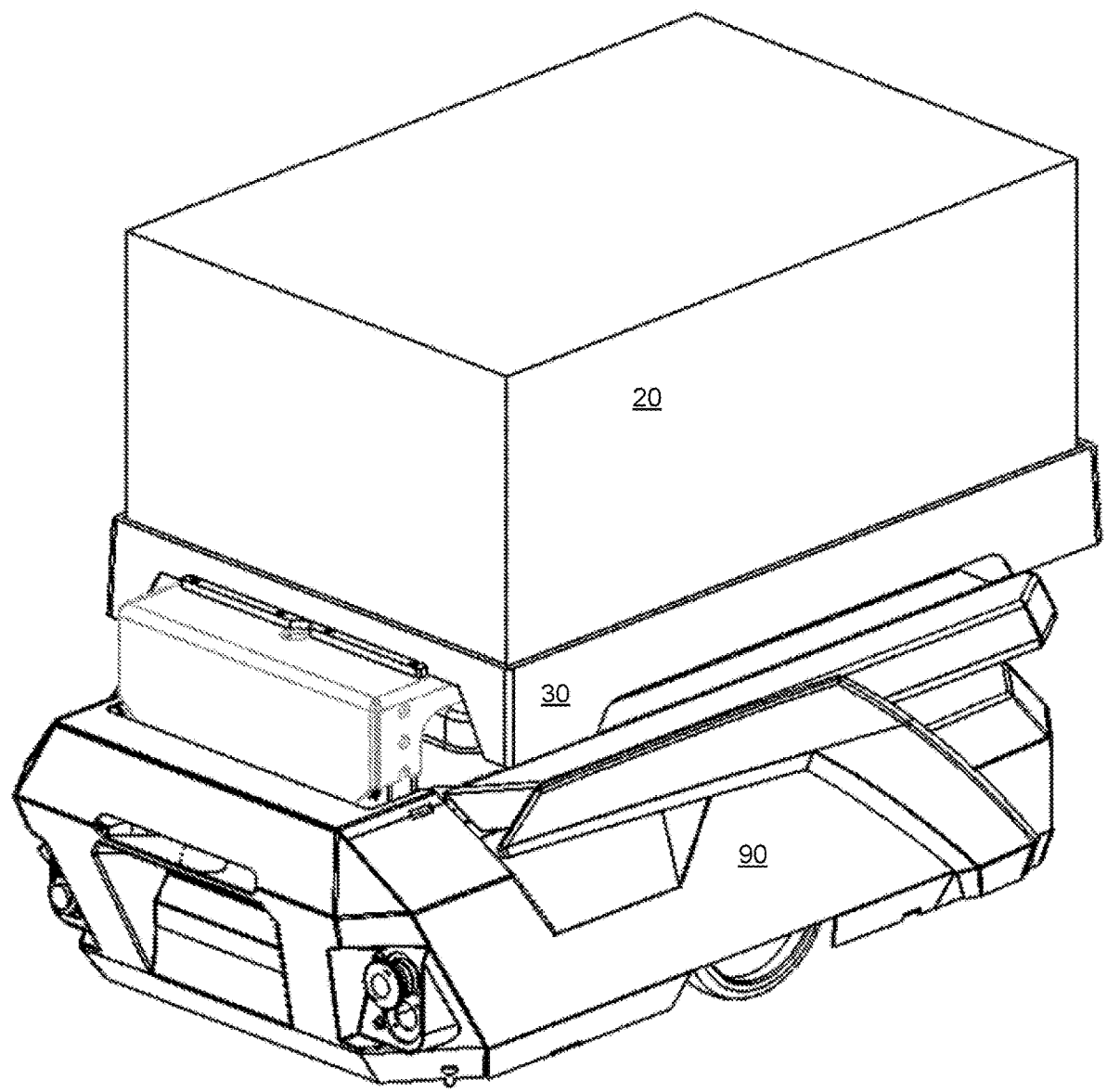
FIG. 26 illustrates an example of a first robot and a box.
Figure 27:
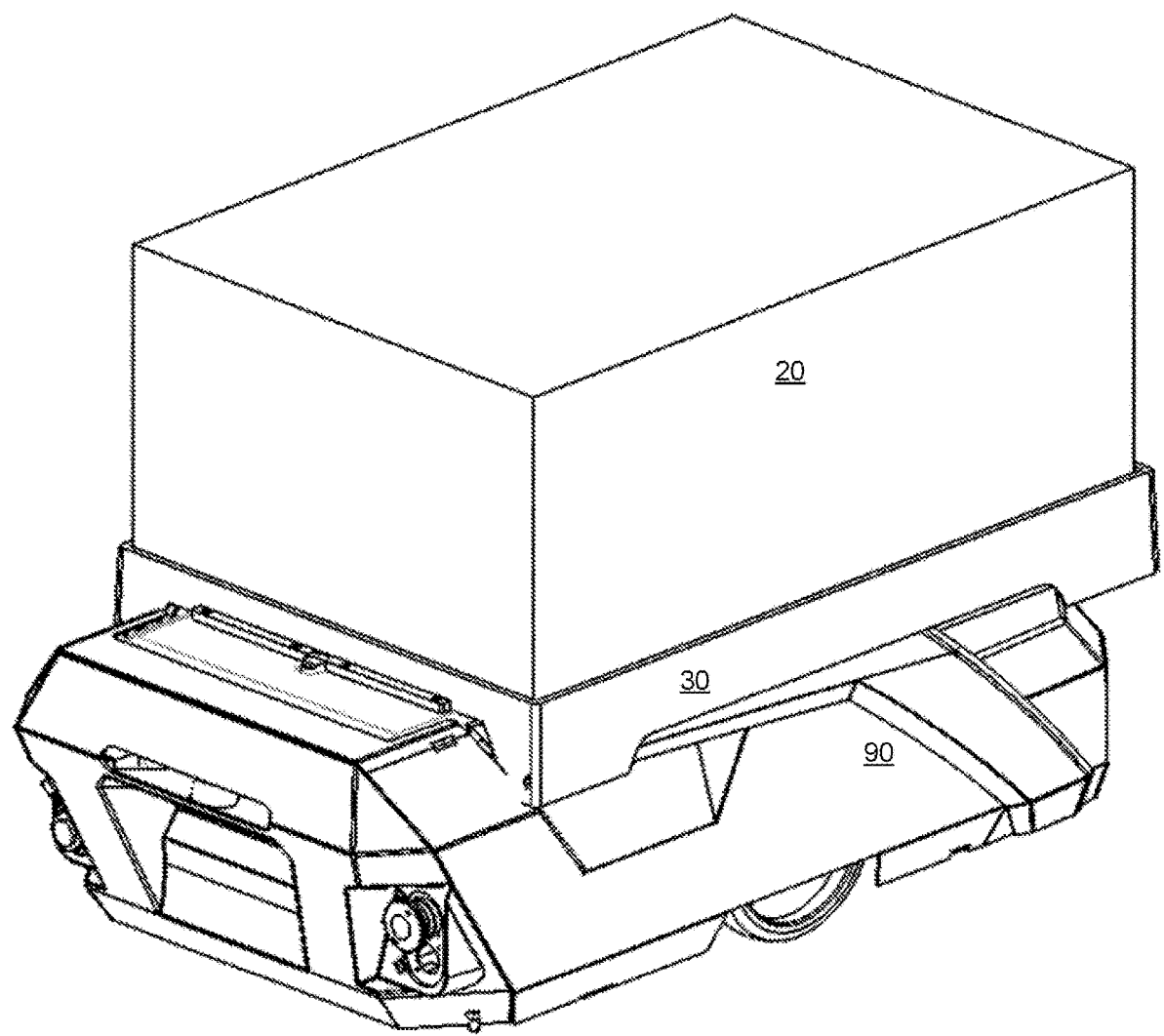
FIG. 27 illustrates an example of a first robot and a box.
Figure 28:
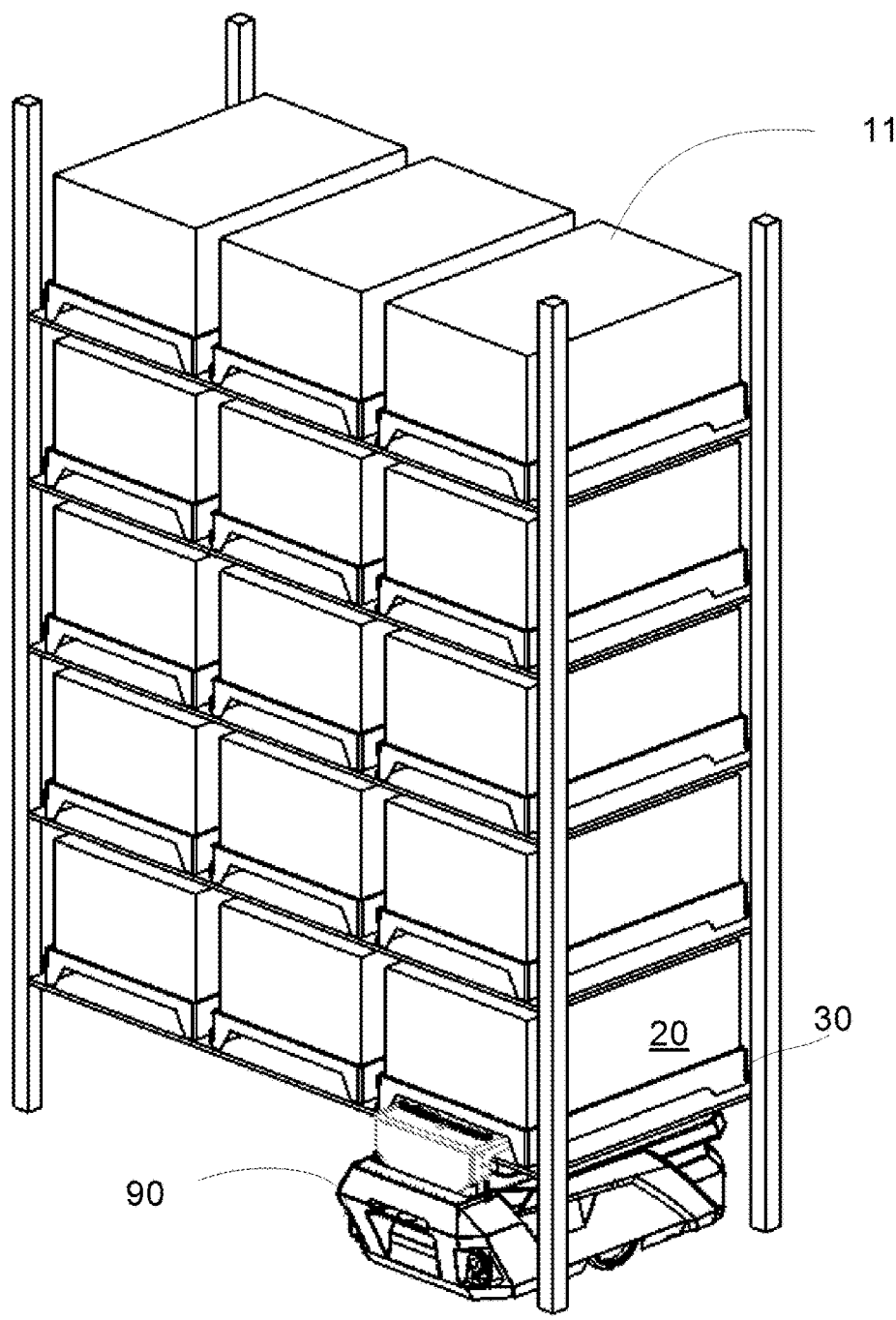
FIG. 28 illustrates an example of a first robot and a storage unit.
Figure 29:
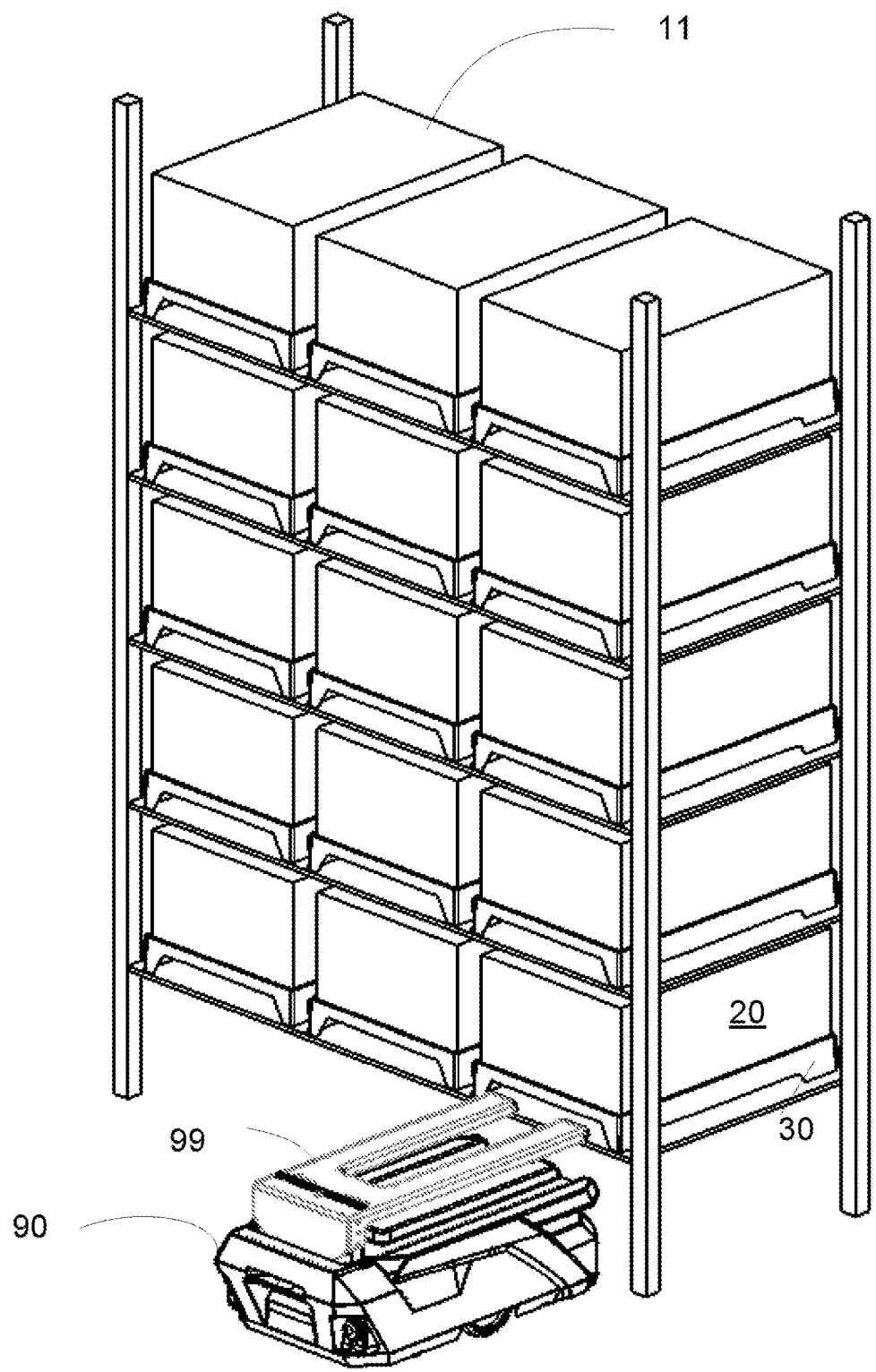
FIG. 29 illustrates an example of a first robot and a storage unit.
Figure 30:
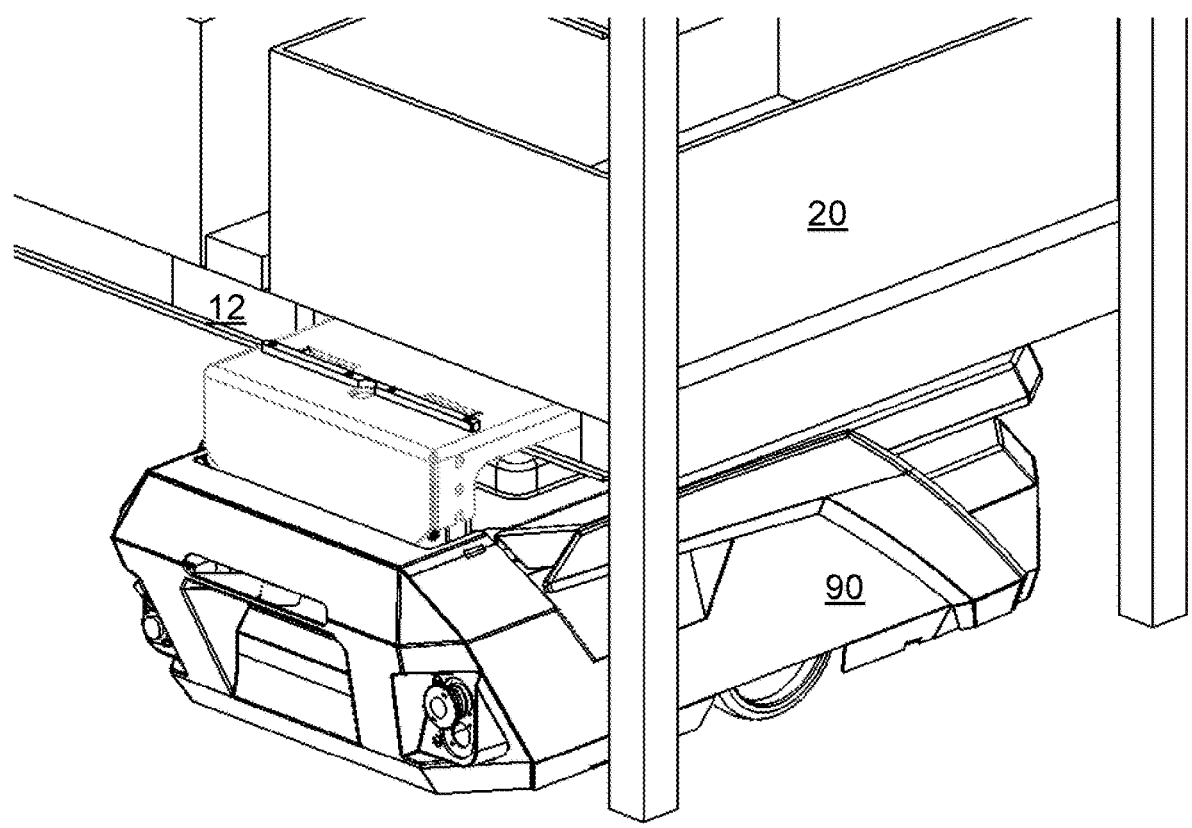
FIG. 30 illustrates an example of a first robot and a storage unit.
Figure 31:
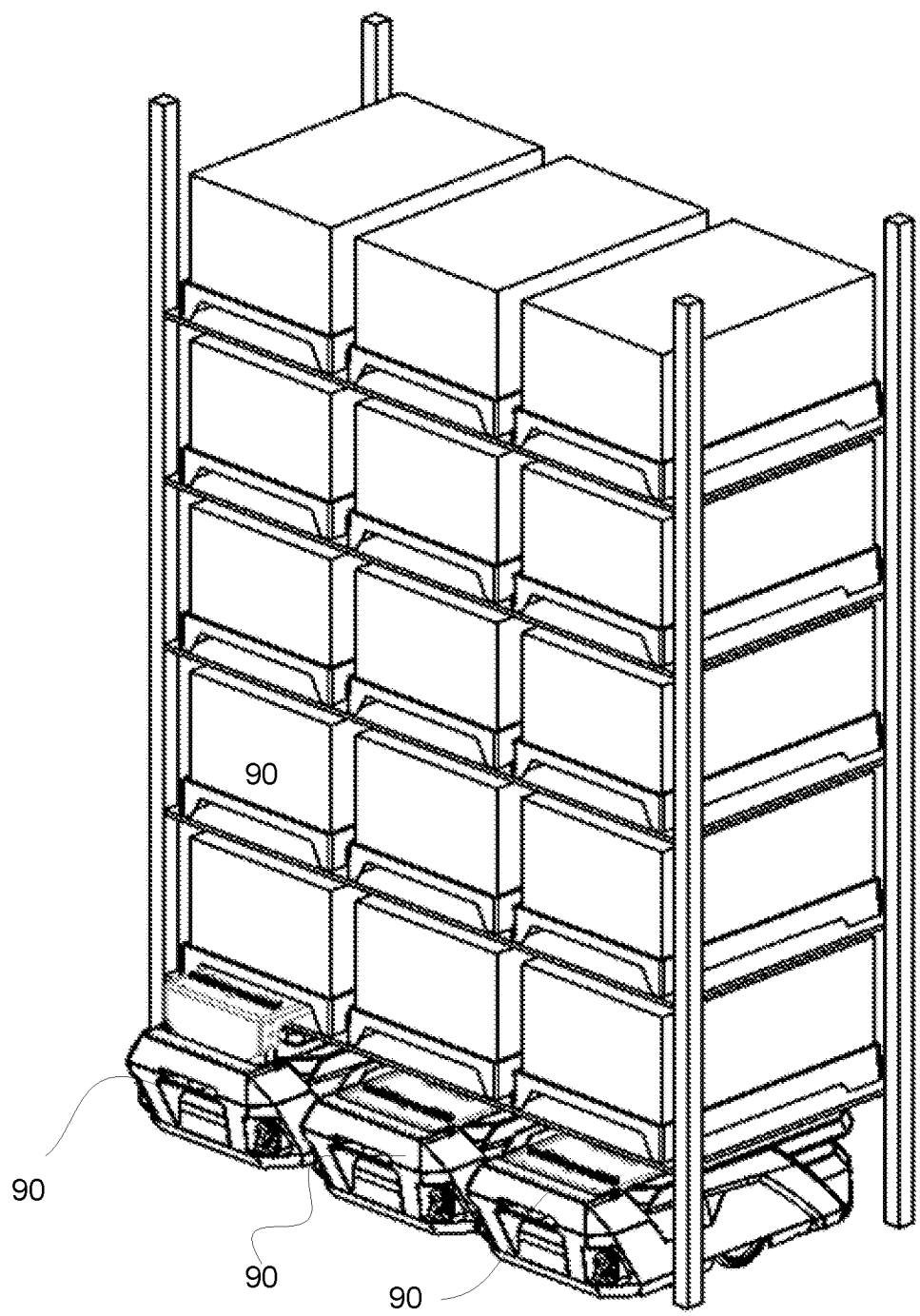
FIG. 31 illustrates an example of a triplet of first robots and a storage unit.
Figure 32:
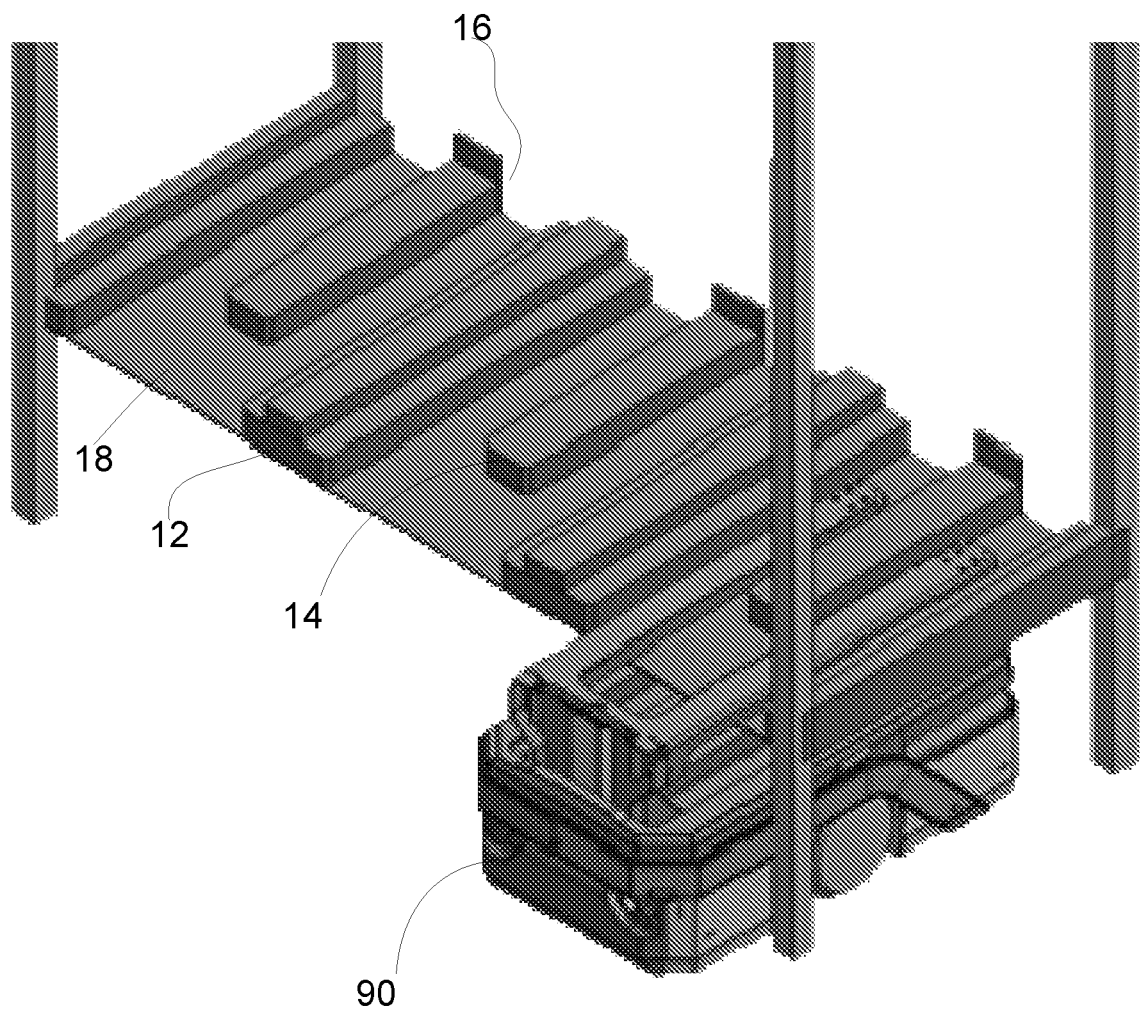
FIG. 32 illustrates an example of a first robot.
Figure 33:
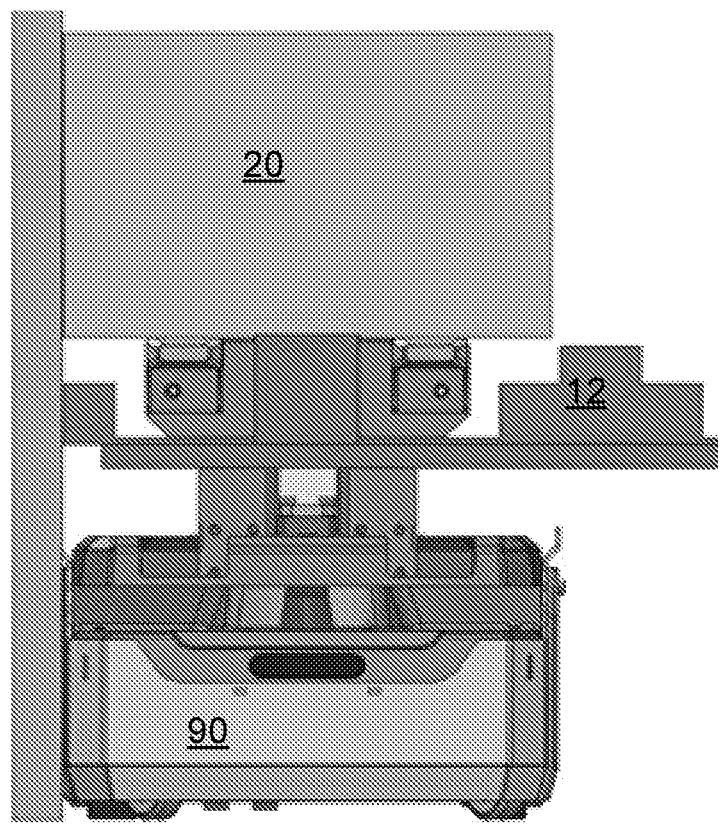
FIG. 33 illustrates an example of a first robot and a box.
Figure 34:
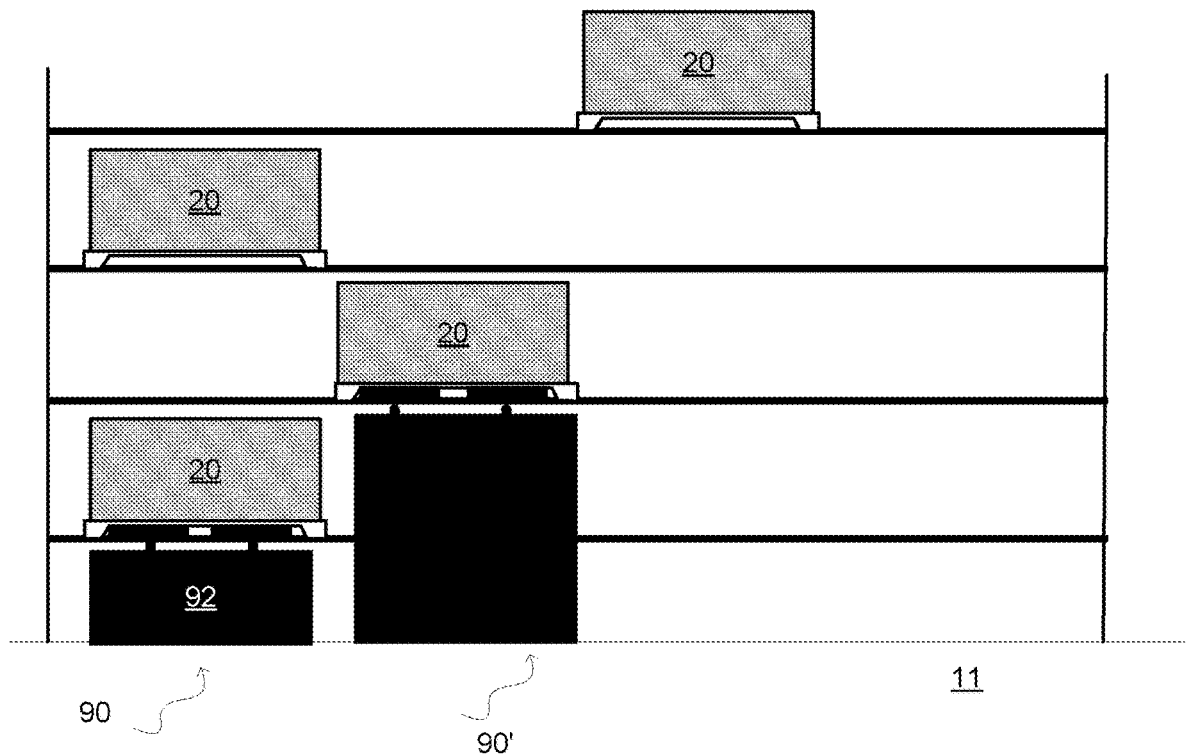
FIG. 34 illustrates an example of a storage unit equipped with movable adaptors and boxes, a first robot and a second robot.

FIG. 21-33 illustrate example of first robot 90. Some of these figures also illustrates the first robot 90 below a lowest shelf, accessing the lowest shelf, loading or unloading a box, and the like. FIG. 34 illustrates a first robot and a second robot that access boxes of a storage unit 11. FIG. 24 illustrates a tunnel 66 formed at the top of the housing. The robot interfacing element 99 can be at least partially within the tunnel when the first robot is at to lower position. When carrying a box the first robot may not be able to move below the lowest shelf.

The first robot 90 may include (a) a communication unit 625 for communicating with other entities such as a controlling system, an interfacing unit, one or more other robots, (b) a controller 600 for controlling the first robot 90, (c) one or more sensors of any type for sensing the environment of the first robot, (d) a navigation module 620 for navigating the first robot, (e) robot interfacing element 99, (f) a robot interfacing element manipulator 61 for manipulating the robot interfacing element (for example elevating and lowering the robot interfacing element), (g) a propulsion unit 630 for moving the first robot, and a housing 63.

The propulsion unit 630 may include a first propulsion module 631, a second propulsion module 632 and wheels 64, 65 and 66. The first and second propulsion modules may independently rotate wheels 64 and 65—thus allowing a small rotation radius and increased control of the progress of the first robot. Wheel 66 may be a swivel wheel. It should be noted that any other propulsion unit may be provided, any number of wheels may be provided, the wheels may be replaced by tracks, and the like.

Figure 35:
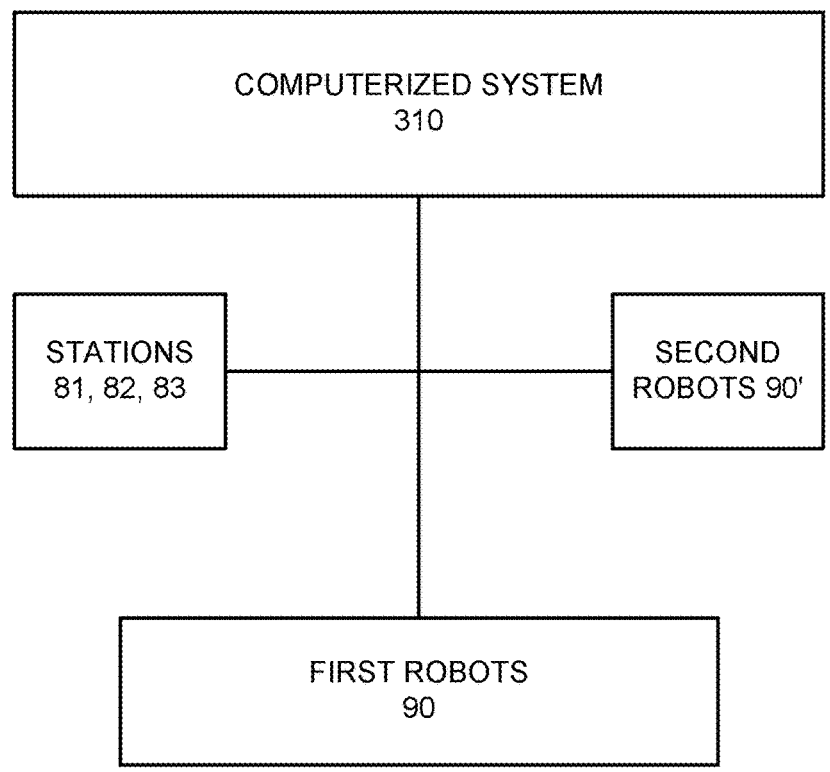
FIG. 35 is an example of a system for managing a warehouse.

FIG. 35 illustrates a system that may include a computerized system 300 that may communication with first robots 90, second robots 90' and interfacing units such as 81, 82 and 83. The interfacing units 81, 82 and 83 may send requests from operators that should be executed by the first and second robots. The computerized system may determine the arrangement of boxes in the storage units. The computerized system may be a remote computer (including but not limited to a cloud computer).

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a system or robot as including a certain component should also cover the scenario in which the system or robot does not include the certain component. For example—any reference to a method as including a certain step should also cover the scenario in which the method does not include the certain component. Yet for another example—any reference to a system or robot that is configured to perform a certain operation should also cover the scenario in which the system or robot is not configured to perform the certain operation.

The terms robot may refer to a self-propelled system or robot.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the system or robot and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit of system or robot that is illustrated in any of the figures and/or specification and/or the claims may be provided.

Any combination of any system or robot illustrated in any of the figures and/or specification and/or the claims may be provided.

Any combination of any set of pool cleaning robots illustrated in any of the figures and/or specification and/or the claims may be provided.

Any combination of steps, operations and/or methods illustrated in any of the figures and/or specification and/or the claims may be provided.

Any combination of operations illustrated in any of the figures and/or specification and/or the claims may be provided.

Any combination of methods illustrated in any of the figures and/or specification and/or the claims may be provided.

We claim:

1. A method for retrieving boxes stored in a warehouse, the method comprises:
    determining an arrangement of boxes in storage units of the warehouse to maintain boxes in low shelves of the storage unit, while maintaining boxes in higher shelves of the storage unit;
    allocating one or more first robots to access the boxes of the lowest shelf directly from the storage units;
    allocating one or more second robots to access the boxes of the higher shelves directly from the storage units, the one or more second robots differing from the one or more first robots.

2. The method according to claim 1 wherein allocating one or more first robots to access a box of the lowest shelf includes allocating one or more first robots to reach the storage unit by moving below the lowest shelf.

3. The method according to claim 2 wherein allocating one or more robots to access the box includes, following the reaching of the storage unit, allocating one or more first robots to lift robot interfacing element of the first robot, move the first robot in relation to the box such that the robot interfacing element is inserted in a gap between a surface of the lower shelf and a bottom of the box; lift the box by the robot interfacing element; and move the robot with the box away from the lower shelf.

4. The method according to claim 3 wherein the allocating of one or more robots to access the box includes executing the access without rotating the robot interfacing element in relation to a housing of the first robot.

5. The method according to claim 3 further including positioning an adaptor on a shelf.

6. The method according to claim 5 further including elevating a box above a surface of the shelf while maintaining at least a portion of the surface untouched by using the adaptor, which includes spacers.

7. The method according to claim 6 further including preventing at least one box from slipping backwards.

8. The method according to claim 6 further including splitting a gap formed between a bottom of a box, surface of the lowest shelf and a pair of spacers.

9. The method according to claim 2 wherein the allocating one or more first robots to reach the storage unit is followed by allocating one or more first robots to lift robot interfacing element of the first robot, move the first robot in relation to the box such that the robot interfacing element is inserted in a gap between a surface of the lower shelf and a bottom of an adaptor that supports the box; lift the box by the robot interfacing element; and move the robot with the box away from the lower shelf.

10. The method according to claim 1 wherein determining an arrangement of boxes in storage units includes replacing, by the first robot, at least one box from the lowest shelf by at least one box from one of the higher shelves.

11. The method according to claim 1 wherein allocating the accessing of a box of one of the upper shelves includes allocating the second robot to reach the storage unit by moving, at pathways formed between multiple storage units.

12. The method according to claim 1 including: receiving, by the first robot, boxes from the interfacing unit; allocating one or more first robots to access the storage unit and unloading the boxes to the lowest shelf; receiving, by the second robot, boxes from the interfacing unit; and allocating one or more second robots to access the storage unit and unloading the boxes to the upper shelves.

13. The method according to claim 1 including allocating one or more first robots to access one or more boxes of one or more lowest shelves of one or more storage units of the warehouse while allocating one or more second robots to access one or more boxes of one or more higher shelves of the one or more storage units of the warehouse.

14. A non-transitory computer readable medium that stores instructions that once executed by a computerized system causes the computerized system to execute a process of retrieving boxes stored in a warehouse, by:
  determining an arrangement of boxes in storage units of the warehouse to maintain boxes of one or more low shelves of a storage unit, while maintaining in boxes of one or more higher shelves;
  allocating one or more first robots to access the boxes of one or more lower shelves directly from the storage units;
  allocating one or more second robots to access the boxes of the higher shelves directly from the storage units, the one or more second robots differing from the one or more first robots.

* * * * *